(12) United States Patent
Kawai

(10) Patent No.: US 12,306,972 B2
(45) Date of Patent: May 20, 2025

(54) CONTROL SYSTEM, METHOD, AND CONTROL DEVICE

(71) Applicant: OMRON CORPORATION, Kyoto (JP)

(72) Inventor: Ko Kawai, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 562 days.

(21) Appl. No.: 17/434,189

(22) PCT Filed: Feb. 12, 2020

(86) PCT No.: PCT/JP2020/005276
§ 371 (c)(1),
(2) Date: Aug. 26, 2021

(87) PCT Pub. No.: WO2020/184036
PCT Pub. Date: Sep. 17, 2020

(65) Prior Publication Data
US 2022/0164464 A1 May 26, 2022

(30) Foreign Application Priority Data
Mar. 14, 2019 (JP) .................. 2019-046799

(51) Int. Cl.
*G06F 21/62* (2013.01)
(52) U.S. Cl.
CPC ............... *G06F 21/6218* (2013.01)
(58) Field of Classification Search
None
See application file for complete search history.

(56) References Cited

U.S. PATENT DOCUMENTS

2003/0018804 A1* 1/2003 Laxman .................. H04L 61/00
709/236
2003/0144753 A1 7/2003 Otani et al.
(Continued)

FOREIGN PATENT DOCUMENTS

| CN | 104956273 A | 9/2015 |
| GB | 2509064 A | 6/2014 |

(Continued)

OTHER PUBLICATIONS

Extended European Search Report dated Oct. 24, 2022 in Application No. 20769699.8.
(Continued)

*Primary Examiner* — Bassam A Noaman
(74) *Attorney, Agent, or Firm* — Sughrue Mion, PLLC

(57) ABSTRACT

A control system that controls access to data in plural devices in communication with each other includes a first device of the plural devices that receives, in a removable manner, a storage medium in which data is storable, and one or more second devices included in the plural devices. Each member of the plural devices and the storage medium includes a storage region that retains a list including relevant information associated with each of the members, and a verifier that verify the relevant information included in the list against the relevant information obtained from each of the other members. The first device accesses the data stored in the storage medium when a result of verification of each of the other members but the first device satisfies a predetermined condition.

14 Claims, 13 Drawing Sheets

(56) References Cited

U.S. PATENT DOCUMENTS

| | | | |
|---|---|---|---|
| 2005/0162992 A1 | 7/2005 | Nakashima et al. | |
| 2006/0129819 A1 | 6/2006 | Hirota et al. | |
| 2011/0264688 A1* | 10/2011 | Dettinger | G06F 16/24575 715/810 |
| 2012/0331526 A1* | 12/2012 | Caudle | G06F 21/6209 726/4 |
| 2014/0143605 A1* | 5/2014 | Balla | G06F 9/44505 714/38.1 |
| 2015/0362903 A1 | 12/2015 | Ono et al. | |
| 2018/0121909 A1* | 5/2018 | Christidis | H04L 9/3236 |
| 2018/0212970 A1* | 7/2018 | Chen | H04L 9/3236 |
| 2022/0058259 A1* | 2/2022 | Kobayashi | G06F 21/44 |

FOREIGN PATENT DOCUMENTS

| | | |
|---|---|---|
| JP | 2002-99344 A | 6/2002 |
| JP | 2004-5389 A | 1/2004 |
| JP | 2006-106998 A | 4/2006 |
| JP | 2011-215814 A | 10/2011 |
| JP | 2015-207089 A | 11/2015 |
| WO | 2004/084075 A1 | 9/2004 |
| WO | 2008/008245 A2 | 1/2008 |

OTHER PUBLICATIONS

International Search Report for PCT/JP2020/005276 dated, Apr. 7, 2020.

Written Opinion of the International Searching Authority for PCT/JP2020/005276 dated Apr. 7, 2020.

Chinese Office Action dated Dec. 4, 2023 in Application No. 202080017752.2.

Office Action issued Jun. 13, 2024 in Chinese Application No. 202080017752.2.

Li Min, et al., "Design and implementation of FAT32 file system based on SD card", Internet of Things technology, Jul. 2017, pp. 96-102 (12 pages total).

* cited by examiner

FIG.6

EXAMPLE OF SERIAL VERIFICATION ASSESSMENT

VERIFICATION RESULT WITH MEMORY CARD

| Slot | | | | | MEMORY CARD |
|---|---|---|---|---|---|
| 1 | 2 | 3 | 4 | 5 | |
| 1 | 0 | 0 | 0 | 0 | − |

VERIFICATION RESULT WITH SLOT 1

| Slot | | | | | MEMORY CARD |
|---|---|---|---|---|---|
| 1 | 2 | 3 | 4 | 5 | |
| − | 1 | 1 | 1 | 1 | 1 |

VERIFICATION RESULT WITH SLOT 2

| Slot | | | | | MEMORY CARD |
|---|---|---|---|---|---|
| 1 | 2 | 3 | 4 | 5 | |
| 1 | − | 0 | 0 | 0 | 0 |

VERIFICATION RESULT WITH SLOT 3

| Slot | | | | | MEMORY CARD |
|---|---|---|---|---|---|
| 1 | 2 | 3 | 4 | 5 | |
| 1 | 0 | − | 0 | 0 | 0 |

VERIFICATION RESULT WITH SLOT 4

| Slot | | | | | MEMORY CARD |
|---|---|---|---|---|---|
| 1 | 2 | 3 | 4 | 5 | |
| 1 | 0 | 0 | − | 0 | 0 |

VERIFICATION RESULT WITH SLOT 5

| Slot | | | | | MEMORY CARD |
|---|---|---|---|---|---|
| 1 | 2 | 3 | 4 | 5 | |
| 1 | 0 | 0 | 0 | − | 0 |

VERIFICATION RESULT WITH ALL OF MEMBERS

CONSISTENCY = 0, INCONSISTENCY = 1

⇩ ADDITION

| Slot | | | | | MEMORY CARD |
|---|---|---|---|---|---|
| 1 | 2 | 3 | 4 | 5 | |
| 5 | 1 | 1 | 1 | 1 | 1 |

⇩ AVERAGE (%)

| Slot | | | | | MEMORY CARD |
|---|---|---|---|---|---|
| 1 | 2 | 3 | 4 | 5 | |
| 100% | 20% | 20% | 20% | 20% | 20% |

⇩ ASSESSMENT

MEMBER EXCEEDING 50% = 1

⇩ RESULT

RESULT = OK

AVERAGE VALUE GREATER THAN 50%, THREE OR MORE MEMBERS: NG

STRONG POSSIBILITY OF ONE MEMBER HAVING BEEN CHANGED

FIG.8
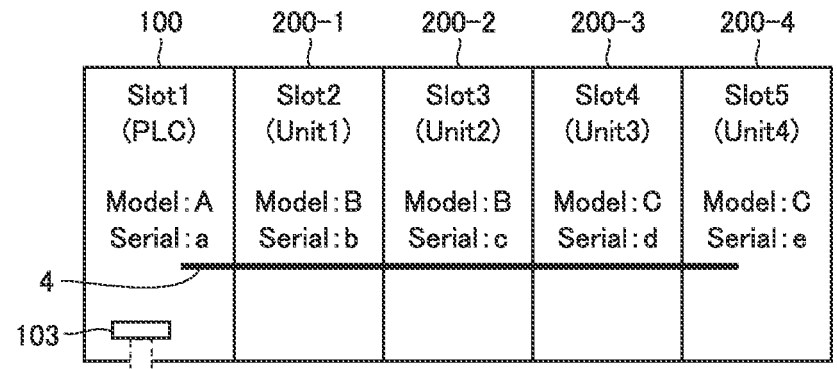
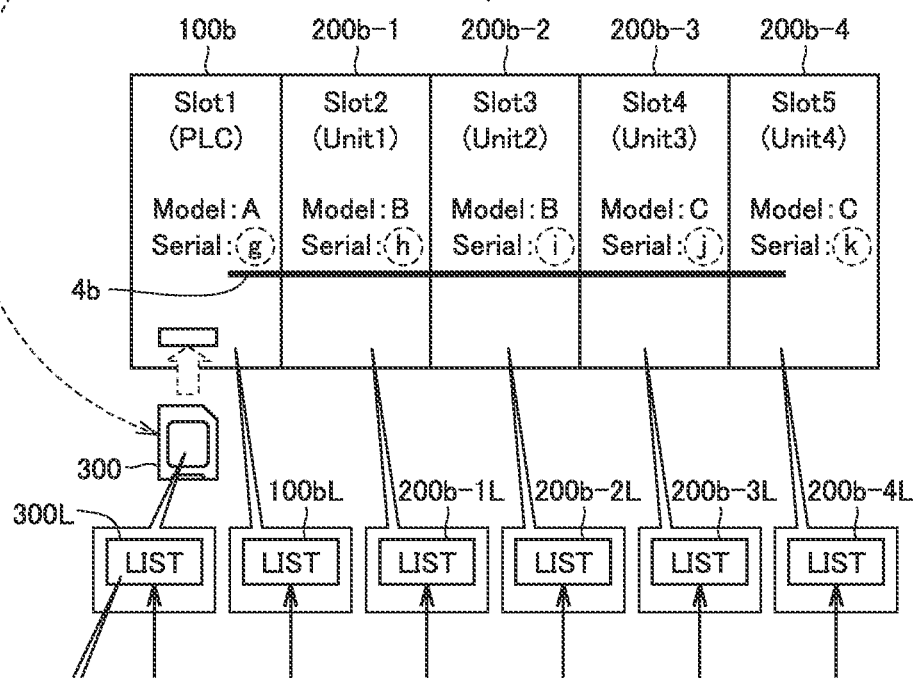
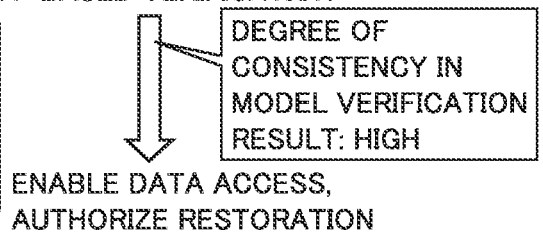

FIG.9  EXAMPLE OF MODEL VERIFICATION ASSESSMENT

VERIFICATION RESULT WITH ALL OF MEMBERS
{ CONSISTENCY = 0, INCONSISTENCY = 1 }

VERIFICATION RESULT WITH MEMORY CARD

| Slot | | | | | MEMORY CARD |
|---|---|---|---|---|---|
| 1 | 2 | 3 | 4 | 5 | |
| 0 | 0 | 0 | 0 | 0 | 0 |

VERIFICATION RESULT WITH SLOT 1

| Slot | | | | | MEMORY CARD |
|---|---|---|---|---|---|
| 1 | 2 | 3 | 4 | 5 | |
| 0 | 0 | 0 | 0 | 0 | 0 |

VERIFICATION RESULT WITH SLOT 2

| Slot | | | | | MEMORY CARD |
|---|---|---|---|---|---|
| 1 | 2 | 3 | 4 | 5 | |
| 0 | 0 | 0 | 0 | 0 | 0 |

VERIFICATION RESULT WITH SLOT 3

| Slot | | | | | MEMORY CARD |
|---|---|---|---|---|---|
| 1 | 2 | 3 | 4 | 5 | |
| 0 | 0 | 0 | 0 | 0 | 0 |

VERIFICATION RESULT WITH SLOT 4

| Slot | | | | | MEMORY CARD |
|---|---|---|---|---|---|
| 1 | 2 | 3 | 4 | 5 | |
| 0 | 0 | 0 | 0 | 0 | 0 |

VERIFICATION RESULT WITH SLOT 5

| Slot | | | | | MEMORY CARD |
|---|---|---|---|---|---|
| 1 | 2 | 3 | 4 | 5 | |
| 0 | 0 | 0 | 0 | 0 | 0 |

↓ ADDITION

| Slot | | | | | MEMORY CARD |
|---|---|---|---|---|---|
| 1 | 2 | 3 | 4 | 5 | |
| 0 | 0 | 0 | 0 | 0 | 0 |

↓ AVERAGE (%)

| Slot | | | | | MEMORY CARD |
|---|---|---|---|---|---|
| 1 | 2 | 3 | 4 | 5 | |
| 0% | 0% | 0% | 0% | 0% | 0% |

↓ ASSESSMENT

AVERAGE VALUE GREATER THAN 50%, 0 MEMBER → NO MEMBER HAS BEEN CHANGED

AVERAGE VALUE GREATER THAN 50%, THREE OR MORE MEMBERS: NG

↓ RESULT

RESULT = OK

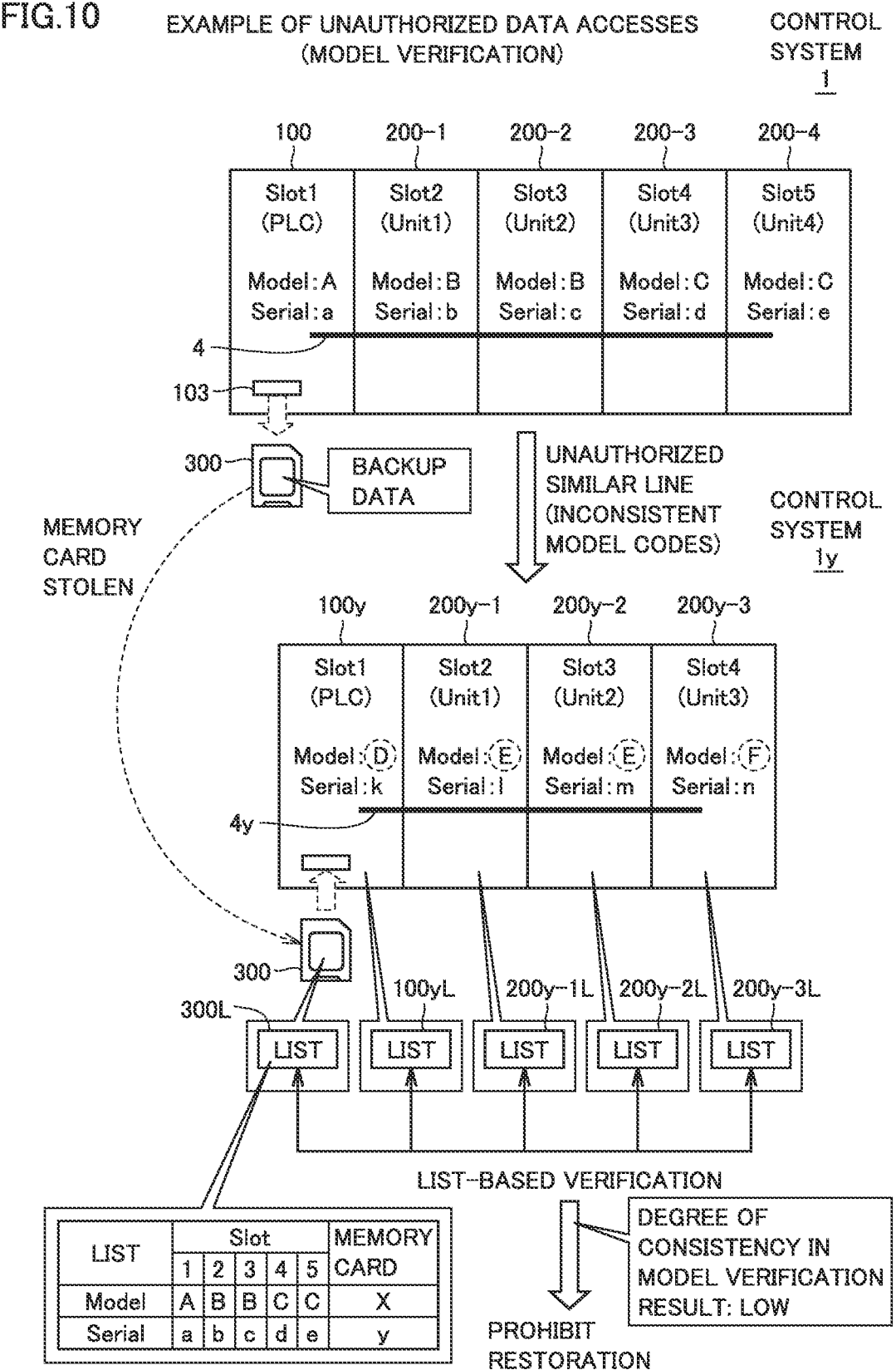

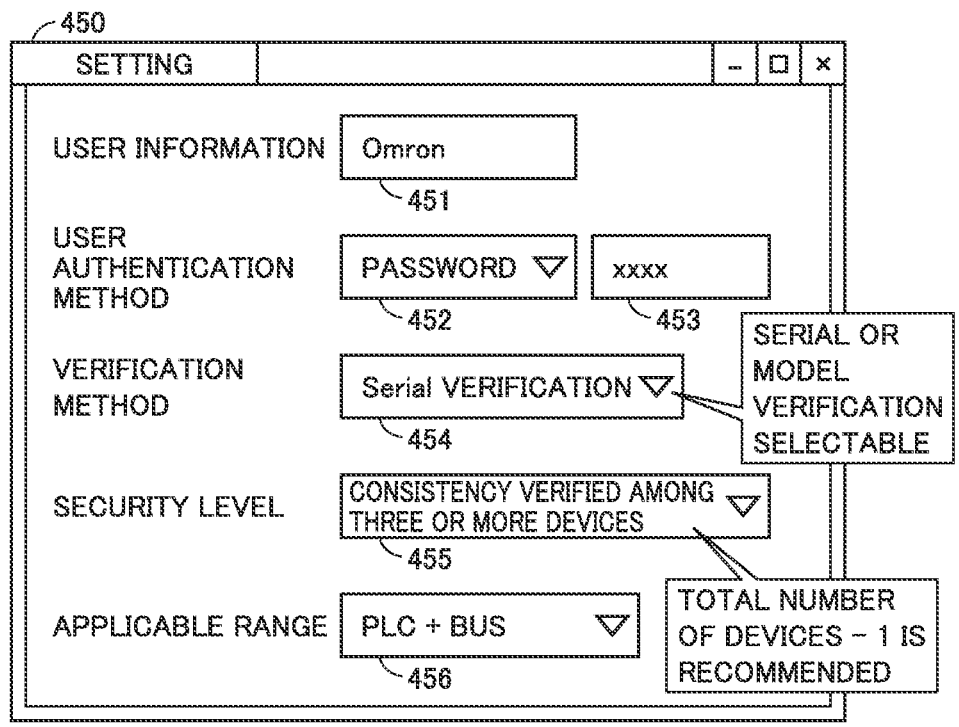
FIG.11 EXAMPLE OF SETTING SCREEN IN SUPPORT DEVICE

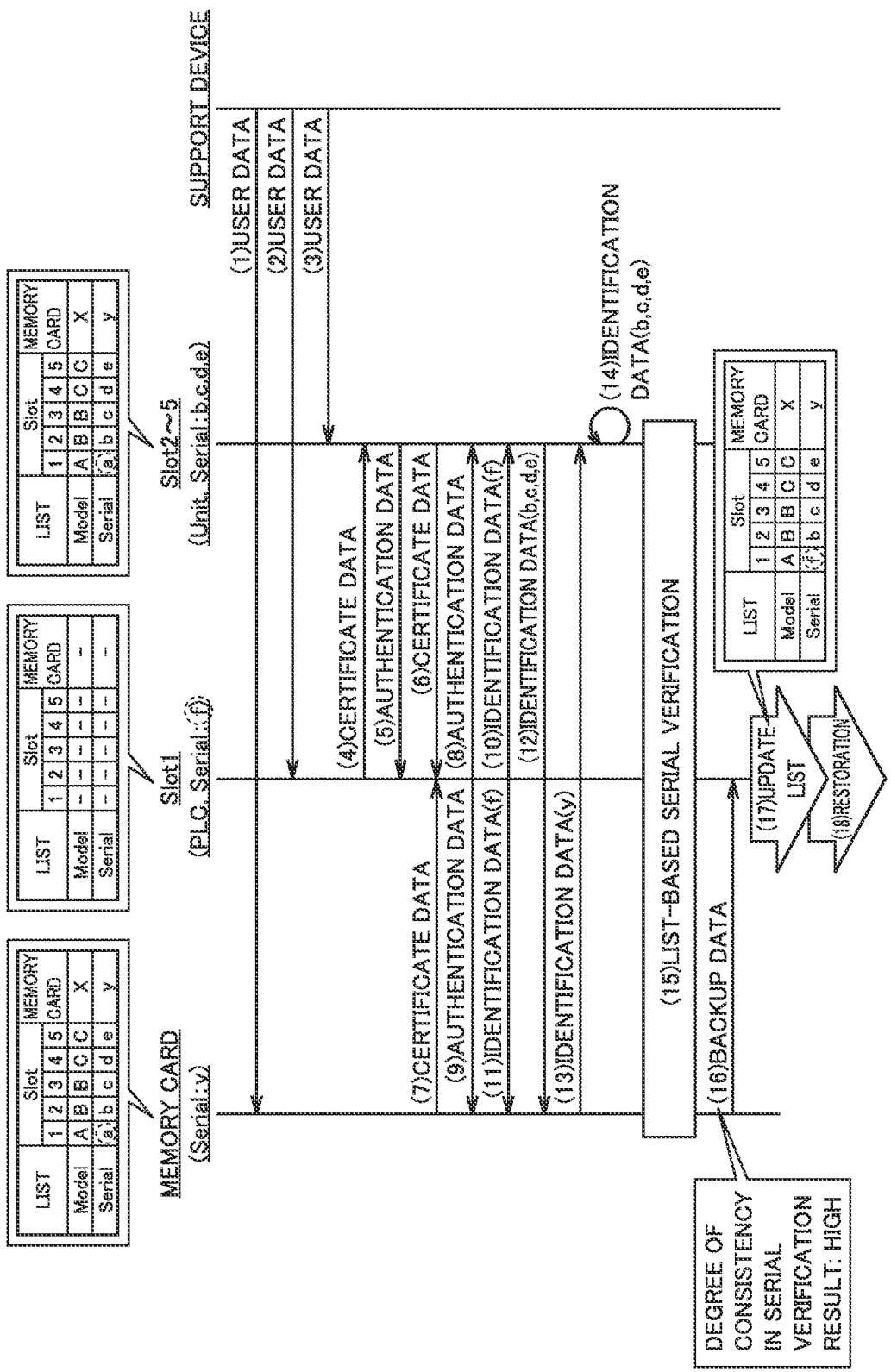

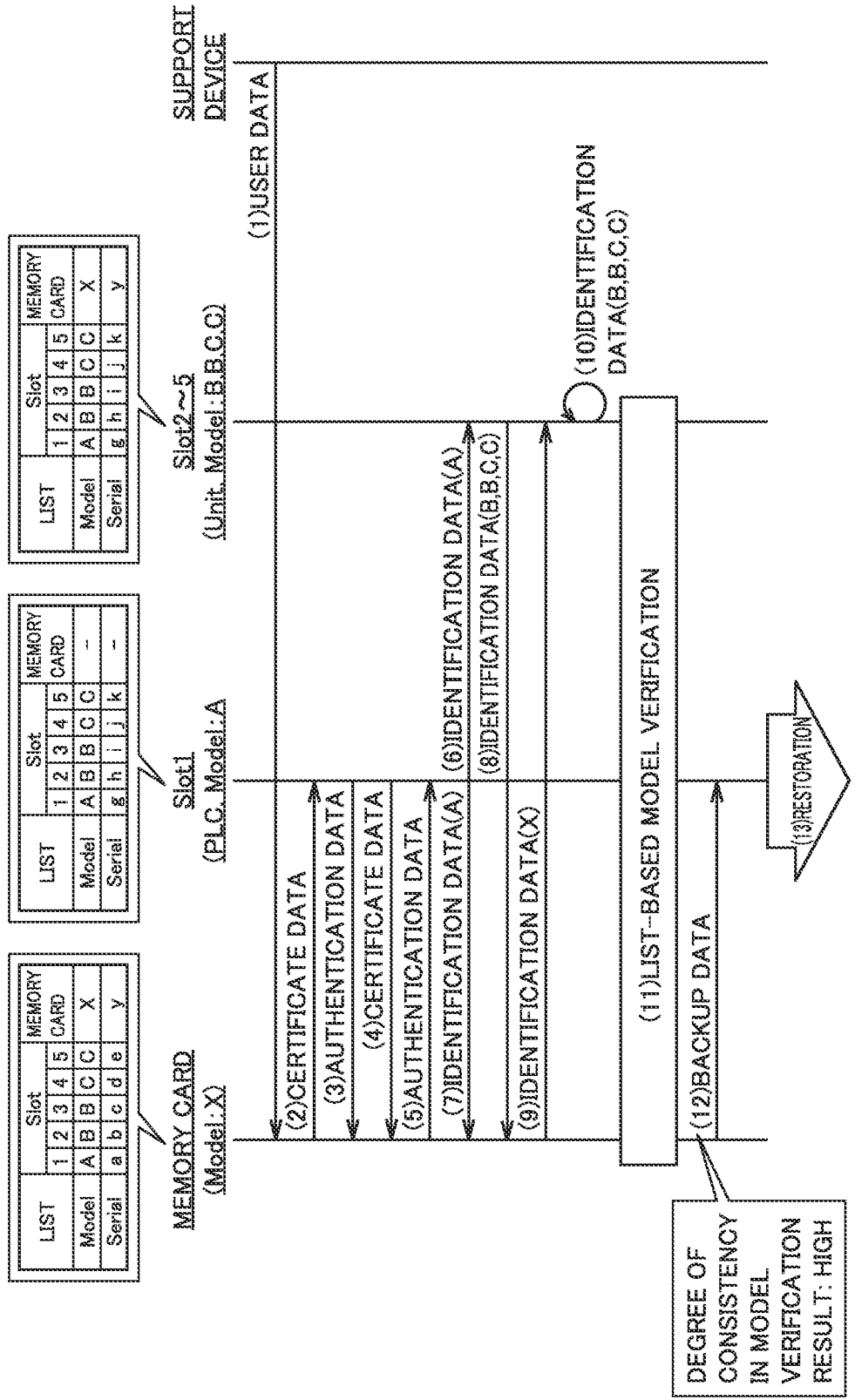

CONTROL SYSTEM, METHOD, AND CONTROL DEVICE

CROSS REFERENCE TO RELATED APPLICATIONS

This application is a National Stage of International Application No. PCT/JP2020/005276 filed Feb. 12, 2020, claiming priority based on Japanese Patent Application No. 2019-046799 filed Mar. 14, 2019, the entire contents of each of which being herein incorporated by reference in their entireties.

TECHNICAL FIELD

This disclosure relates to a control system, a method and a control device, more particularly to a control system, a method and a control device for use in controlling access to data in a device group including a plurality of devices that are configured to communicate with each other.

BACKGROUND ART

In many production sites, machinery and equipment that have been and are currently used in the sites may be typically controlled by control systems including control devices, for example, programmable logic controllers (hereinafter, may be referred to as "PLC"). Conventionally, data stored in removable storage media are often used in such control systems for system recovery or update of programs and/or data.

For example, Japanese Patent Laying-Open No. 2011-215814 (patent literature 1) describes a backup and restoration system operable to backup or restore set values of target parameters in communication devices using a backup and restoration unit connected to the programmable logic controller (PLC). In this backup and restoration system, backup data stored in a removable storage medium, such as a memory card, is used to restore various pieces of data.

CITATION LIST

Patent Literature

PTL 1: Japanese Patent Laying-Open No. 2011-215814

SUMMARY OF INVENTION

Technical Problem

In the known art, data may be often stored in removable storage media and accessed from devices including PLC whenever necessary, as in the backup and restoration system described in the patent literature 1. Such removable storage media that users can easily carry with them are very user-friendly. On the other hand, such media that involve the risk of being stolen may raise certain concerns about security. An example of typical theft preventive measures may be access control through individual authentication using host devices authorized beforehand for the respective storage media. In the FA (factory automation)-related fields, however, the media, in practical use, may not always be inserted in the authorized host devices.

To address these issues of the known art, this disclosure is directed to providing a technology that can offer enhanced security without compromising user-friendliness in data accesses to removable storage media.

Solution to Problem

An aspect of this disclosure provides a control system configured to control access to data in a device group, the device group includes a plurality of devices, and the plurality of devices are configured to communicate with one another. The control system includes a first device included in the plurality of devices and configured to receive, in a removable manner, a storage medium in which data is storable, and one or a plurality of second devices included in the plurality of devices. Each of members of the plurality of devices and the storage medium includes: a storage region configured to retain a list including relevant information associated with each of the members; and a verifying unit configured to verify the relevant information of each of other members included in the list retained in the storage region against the relevant information of each of the other members obtained from each of the other members. The first device is configured to access the data stored in the storage medium when a result of verification obtained by the verifying unit of each of the other members but the first device satisfies a predetermined condition.

In the control system disclosed herein, when a storage medium is received by the first device, any members included in the members but the first device verify the relevant information, and it is not until results of the verification satisfy a predetermined condition that the data stored in the storage medium becomes accessible. This may offer an improved level of security while ensuring user-friendliness in accesses to the data stored in the removable storage medium.

In the control system disclosed herein, the first device includes a reader including a concealed logic for exclusive use, and the storage medium is configured to permit access from the reader alone.

In the control system thus characterized in that the storage medium can only be accessed from the reader of the first device including the concealed logic for exclusive use, a higher level of security may be ensured in data accesses to the removable storage medium.

In the control system disclosed herein, the relevant information includes a serial number for identification of each of the members, and the verifying unit verifies the serial number of each of the other members included in the list retained in the storage region against the serial number of each of the other members obtained from each of the other members.

In the control system thus characterized in that the data stored in the storage medium can only be accessed after a predetermined condition is satisfied by a result of the verification of the serial number used to identify each member. This may offer even a higher degree security in data accesses to the removable storage medium.

In the control system disclosed herein, the relevant information includes a model code of each of the members, and the verifying unit verifies the model code of each of the other members included in the list retained in the storage region against the model code of each of the other members obtained from each of the other members.

In the control system thus characterized in that the data stored in the storage medium can only be accessed after a predetermined condition is satisfied by a result of the verification of the model code of each member. Thus, accesses to the data stored in the storage medium may be enabled for the members of the same model code having different serial numbers. This may ensure a good balance between user-friendliness and better security in data accesses to the removable storage medium.

The control system disclosed herein further includes a support device configured to support the device group. The relevant information includes a serial number used to individually identify each of the members and a model code of each of the members. The verifying unit includes: a first verifying unit configured to verify the serial number of each of the other members included in the list retained in the storage region against the serial number of each of the other members obtained from each of the other members; and a second verifying unit configured to verify model code of each of the other members included in the list retained in the storage region against the model code of each of the other members obtained from each of the other members. The support device provides a user interface configured to select the first verifying unit or the second verifying unit.

In the control system thus characterized in that a user is allowed to select, using the support device, which one of the following is desirably verified; serial numbers used to individually identify the members, and model codes of the members. Thus, the control system may be successfully built in a suitable manner for a level of security required of the system.

The control system disclosed herein further includes a support device configured to support the device group. The support device provides a user interface configured to set a number of any members included in the members but the first device to be verified by the verifying unit.

In the control system thus characterized in that a user is allowed to set, using the support device, the number of members to be verified. Thus, the control system may be successfully built in a suitable manner for a level of security required of the system.

The control system disclosed herein further includes a support device configured to support the device group. The support device provides a user interface configured to set a range of applicable members among the members.

In the control system thus characterized in that a user is allowed to set, using the support device, a range of applicable members. Thus, the control system may be successfully built in a suitable manner for a level of security required of the system.

Another aspect of this disclosure provides a method for controlling access to data in a device group, the device group includes a plurality of devices, and the plurality of devices are configured to communicate with one another. The plurality of devices include a first device configured to receive, in a removable manner, a storage medium in which data is storable, and one or a plurality of second devices. Each of members of the plurality of devices and the storage medium includes a storage region configured to retain a list including relevant information associated with each of the members. The method includes: prompting each of the members to verify the relevant information of each of other members included in the list retained in the storage region against the relevant information of each of the other members obtained from each of the other members; and enabling the first device to access the data stored in the storage medium when a result of verification obtained by each of the other members but the first device satisfies a predetermined condition.

In the control system disclosed herein, when a storage medium is received by the first device, any members included in the members but the first device verify the relevant information, and it is not until results of the verification satisfy a predetermined condition that the data stored in the storage medium becomes accessible. This may offer an improved level of security while ensuring user-friendliness in accesses to the data stored in the removable storage medium.

Yet another aspect of this disclosure provides a control device configured to control access to data and included in a device group, the device group has a plurality of devices, and the plurality of devices are configured to communicate with one another. The control device includes a receiving portion configured to receive, in a removable manner, a storage medium in which data is storable. Each of members of the plurality of devices and the storage medium includes: a storage region configured to retain a list containing relevant information associated with each of the members; and a verifying unit configured to verify the relevant information of each of other members included in the list retained in the storage region against the relevant information of each of the other members obtained from each of the other members. The control device is configured to access the data stored in the storage medium when a result of the verification obtained by the verifying unit of each of the other members but the control device satisfies a predetermined condition.

In the control system disclosed herein, when a storage medium is received by the first device, any members included in the members but the first device verify the relevant information, and it is not until results of the verification satisfy a predetermined condition that the data stored in the storage medium becomes accessible. This may offer an improved level of security while ensuring user-friendliness in accesses to the data stored in the removable storage medium.

BRIEF DESCRIPTION OF DRAWINGS

FIG. 6 is a diagram that schematically illustrates an example of serial verification assessment in the control system according to the embodiments.

FIG. 8 is a diagram that schematically illustrates an exemplified model verification when data is duly accessed in the control system according to the embodiments.

FIG. 9 is a diagram that schematically illustrates an example of model verification assessment in the control system according to the embodiments.

FIG. 10 is a diagram that schematically illustrates an exemplified model verification when data is unduly accessed in the control system according to the embodiments.

FIG. 11 is a diagram that schematically illustrates an exemplified setting screen of the support device according to the embodiments.

FIG. 12 is a sequence diagram that illustrates an exemplified access authentication process using the serial verification executed in the control system according to the embodiments.

FIG. 13 is a sequence diagram that illustrates an exemplified access authentication process using the model verification executed in the control system according to the embodiments.

DESCRIPTION OF EMBODIMENTS

Embodiments of the technology disclosed herein are hereinafter described in detail referring to the accompanying drawings. Any identical, similar and corresponding components are simply marked with like reference signs. Such components, once they are described, will not be repetitively described.

<A. Example of Application>

Hereinafter is described an exemplified case to which the technology disclosed herein is applicable.

Figure 1:
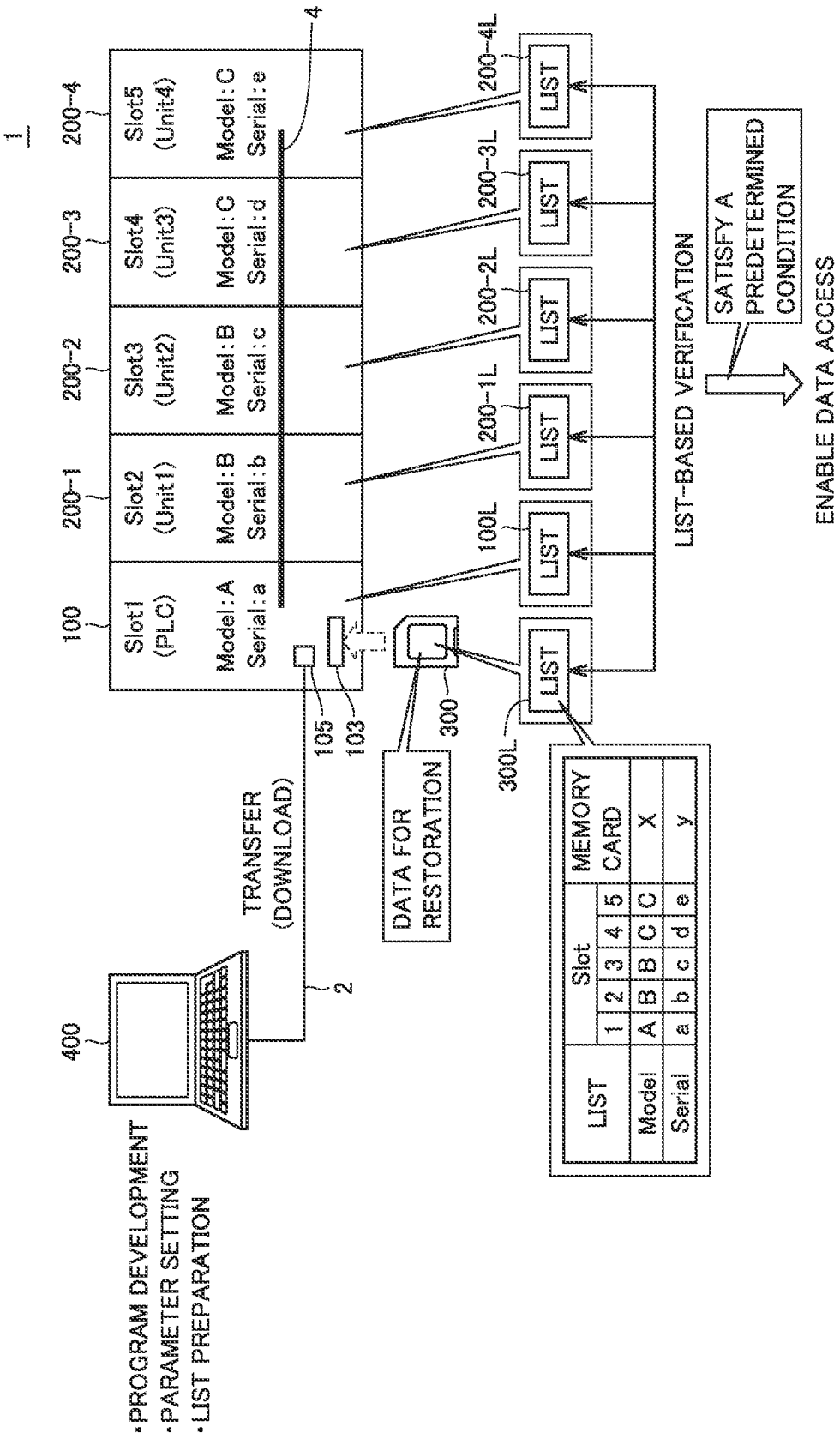
FIG. 1 is a diagram that schematically illustrates a control system according to embodiments of this disclosure.

FIG. 1 is a diagram that schematically illustrates an exemplified case to which a control system 1 is applicable. As illustrated in FIG. 1, control system 1 according to embodiments of this disclosure includes a device group including a plurality of devices that are allowed to communicate with one another.

In the specification of this disclosure, the "device" may refer a target element to be controlled that constitutes control system 1, and programs, configuration settings and parameters required of computations for control may be generated and managed per each device. The "device" may typically encompass in its scope a programmable logic controller (PLC) which is a processing entity in charge of executing a control program (which may include sequence control and motion control), and peripheral devices connected to the PLC. The peripheral device may typically be a device that transmits and receives, to and from targets to be controlled, input and output data handled in the PLC. Specific examples of the peripheral device may include unit, slave device and coupler unit.

In the example illustrated in FIG. 1, control system 1 includes the following devices; a programmable logic controller (PLC) 100, and a plurality of units 200-1, 200-2, 200-3 and 200-4 (hereinafter, may be collectively referred to as "units 200") connectable to the PLC 100 in a manner that these units are allowed to communicate with the PLC. PLC 100 is presented an example of the "first device", and units 200 are presented as an example of the "second device". The "first device" and the "second device" may be any one of such devices as PLC, unit, slave device, and coupler unit.

With PLC 100 being disposed in a slot 1 (Slot 1 in the drawing) as a key device, unit 200-1 is disposed in a slot 2 (Unit 1 in the drawing), unit 200-2 is disposed in a slot 3 (Unit 2 in the drawing), unit 200-3 is disposed in a slot 4 (Unit 3 in the drawing), and unit 200-4 is disposed in a slot 5 (Unit 4 in the drawing). These units 200-1 to 200-4 are connected to PLC 100 through a local bus 4 and are thereby allowed to communicate with PLC 100.

Control system 1 further includes a support device 400 configured to support the device group. Support device 400 is in charge of developing and managing control programs executed in the devices of control system 1 and parameters required of this system. PLC 100 is equipped with a USB (Universal Serial Bus) connector 105 connectable to and allowed to communicate with support device 400. Any programs and parameters for settings developed by support device 400 are transferred (downloaded) through USB connector 105 into PLC 100 and units 200 by way of a network 2.

Control system 1 thus configured is loaded with functions for system recovery and update of data and programs in which the data stored in removable storage media is used. For example, PLC 100 has a memory card interface 103 which receives memory card 300 in a removable manner. The data can be acquired by accessing memory card 300 mounted to memory card interface 103. Memory card interface 103 is an example of the "receiving portion".

A specific use of this memory card interface may be backup and recovery of the system. For example, a user may store and save, in memory card 300, pieces of data used in the devices through memory card interface 103. The device, if it breaks down, may be replaced with a new device, and the data saved and stored in memory card 300 (hereinafter, may be referred to as "backup data") may be reloaded in the new device. This process may also be referred to as "restoration". The backup data may typically be used to fix any bugs and errors of control system 1.

Memory card 300 described herein as an example of the "storage medium" may be selected from any removable memory cards such as SD (Secure Digital) cards. Other examples of the "storage medium" may include any removable storage media such as USB memory, compact flash (registered trademark) and memory stick.

The "data" stored in the storage medium may include the backup data described earlier, programs and parameters used in the devices, and log data and trace data obtained by the devices.

The backup data may be stored in removable memory card 300 to invite the devices, for example, PLC 100, to access the stored data, whenever necessary. Such removable memory card 300 that users can easily carry with them is thus very user-friendly. On the other hand, such removable medium that involves the risk of being stolen may raise certain concerns about security. An example of typical theft preventive measures may be access control through individual authentication using a host device(s) authorized beforehand for memory card 300. In the FA (factory automation)-related fields, however, memory card 300, in practical use, may not always be inserted in such an authorized host device.

For example, a system with a higher level of security may certainly be feasible as a tighter access restriction is imposed on memory card 300. This, however, may invite the risk of poor workability in practical use. To cope with such a trade-off problem, control system 1 according to the embodiments disclosed herein is provided with a technology that may ensure a higher level of security without compromising user-friendliness in data accesses to the data in removable memory card 300.

Specifically, control system 1 is so configured that, in case memory card 300 inserted in a particular device of the device group fails to authenticate the device loaded with memory card 300, this particular device is enabled to access the data in memory card 300, insofar as consistency is determined among configurations of the other devices of the device group currently interconnected. This technical feature is hereinafter described in detail.

In this embodiment, memory card 300 and the devices including PLC 100 and units 200-1 to 200-4 may be each referred to as "member". The members each include a storage region in which a list containing pieces of relevant information associated with the members is retainable. The "relevant information" may be any information that can be used to identify each member. In this embodiment, the relevant information may include model codes (Model in the drawing) and serial numbers (Serial in the drawing).

The "model code" represents a model that allows each member to be distinguished from the other members based on differences in structure, facility and outer shape. The "serial number" represents a number that can be used to individually identify each member, an example of which may be a unique production number assigned to each product to be shipped out. The serial number is typically unique to each member, which may avoid the risk of different serial numbers being redundantly used among the members. On the other hand, the model codes are respectively assigned to specific models of products, which may possibly be shared among some of the members.

As for PLC 100 illustrated in the example of FIG. 1, "A" as model code and "a" as serial number are assigned to this device. As for unit 200-1 illustrated in this drawing, "B" as model code and "b" as serial number are assigned to this device. As for unit 200-2 illustrated in this drawing, "B" as model code and "c" as serial number are assigned to this device. As for unit 200-3 illustrated in this drawing, "C" as model code and "d" as serial number are assigned to this device. As for unit 200-4 illustrated in this drawing, "C" as model code and "e" as serial number are assigned to this device. While the unique serial numbers are thus assigned to PLC 100 and units 200-1 to 200-4, the same model code "B" is assigned to units 200-1 and 200-2 and the same model code "C" is assigned to units 200-3 and 200-4.

As for memory card 300, "X" as model code and "y" as serial number are assigned to this member.

Memory card 300 retains a list 300L, PLC 100 retains a list 100L, and units 200-1 to 200-4 respectively retain lists 200-1L to 200-4L. These lists are prepared by support device 400 and transferred into the devices. These lists are also retained in memory card 300 by way of support device 400 or PLC 100.

In the example of FIG. 1 are illustrated contents of list 300L retained in memory card 300. List 300L contains the model codes (Model) and the serial numbers (Serial) assigned to slots 1 to 5 and also contains the model code (Model) and the serial number (Serial) of memory card 300. Thus, memory card 300 is allowed to grasp the members currently on the system by checking list 300L.

The contents of the lists retained by the members remain unchanged unless the members are changed or replaced. Specifically, list 300L illustrated in FIG. 1 have the same contents as those of list 100L retained by PLC 100 and of lists 200-1L to 200-4L retained by units 200-1 to 200-4.

Further, the members are configured to verify pieces of relevant information associated with and obtained from the other members against pieces of relevant information associated with the other members and included in the lists retained by the other members.

Specifically, memory card 300 verifies the model codes and the serial numbers of and obtained from the other members (PLC 100, units 200) against the model codes and the serial numbers of the other members (PLC 100, units 200) included in the list currently retained by memory card 300 to determine consistency or inconsistency between these pieces of relevant information of the other members (PLC 100, units 200) obtained from the different sources.

Similarly, PLC 100 verifies the model codes and the serial numbers of and obtained from the other members (memory card 300, unit 200) against the model codes and the serial numbers of the other members (memory card 300, unit 200) included in the list currently retained by PLC 100 to determine consistency or inconsistency between these pieces of relevant information of the other members (memory card 300, unit 200) obtained from the different sources.

Similarly, units 200 verify the model codes and the serial numbers of and obtained from the other members (memory card 300, PLC 100, other units 200) against the model codes and the serial numbers of the other members (memory card 300, PLC 100, other units 200) included in the lists currently retained by units 200 to determine consistency or inconsistency between these pieces of relevant information of the other members (memory card 300, PLC 100, other units 200) obtained from the different sources.

When memory card 300 is inserted in PLC 100, accesses by PLC 100 to the data stored in memory card 300 are enabled, insofar as results of verification by the members satisfy a predetermined condition. The "predetermined condition" may be optionally selected from any conditions under which the data stored in memory card 300 is accessible in view of security.

When, for example, memory card 300 is inserted in PLC 100, the members currently on the system are verified by any members included in the members but PLC 100 (memory card 300, unit 200) based on the lists retained by the members except PLC 100. Then, accesses by PLC 100 to the data stored in memory card 300 are enabled, insofar as the degree of consistency between results of verification by the members is greater than a certain value.

In control system 1 according to the embodiments, when memory card 300 is received by PLC 100, the data stored in memory card 300 only becomes accessible after a predetermined condition is satisfied by results of verification of the relevant information by any members included in the members but PLC 100 (memory card 300, units 200). This may ensure a higher level of security without compromising user-friendliness in accesses to the data stored in removable memory card 300.

<B. Hardware Components and Configurations of Devices Included in Control System 1>

Next, hardware components and configurations of the devices included in control system 1 are hereinafter described.

(b1: PLC 100)

Figure 2:
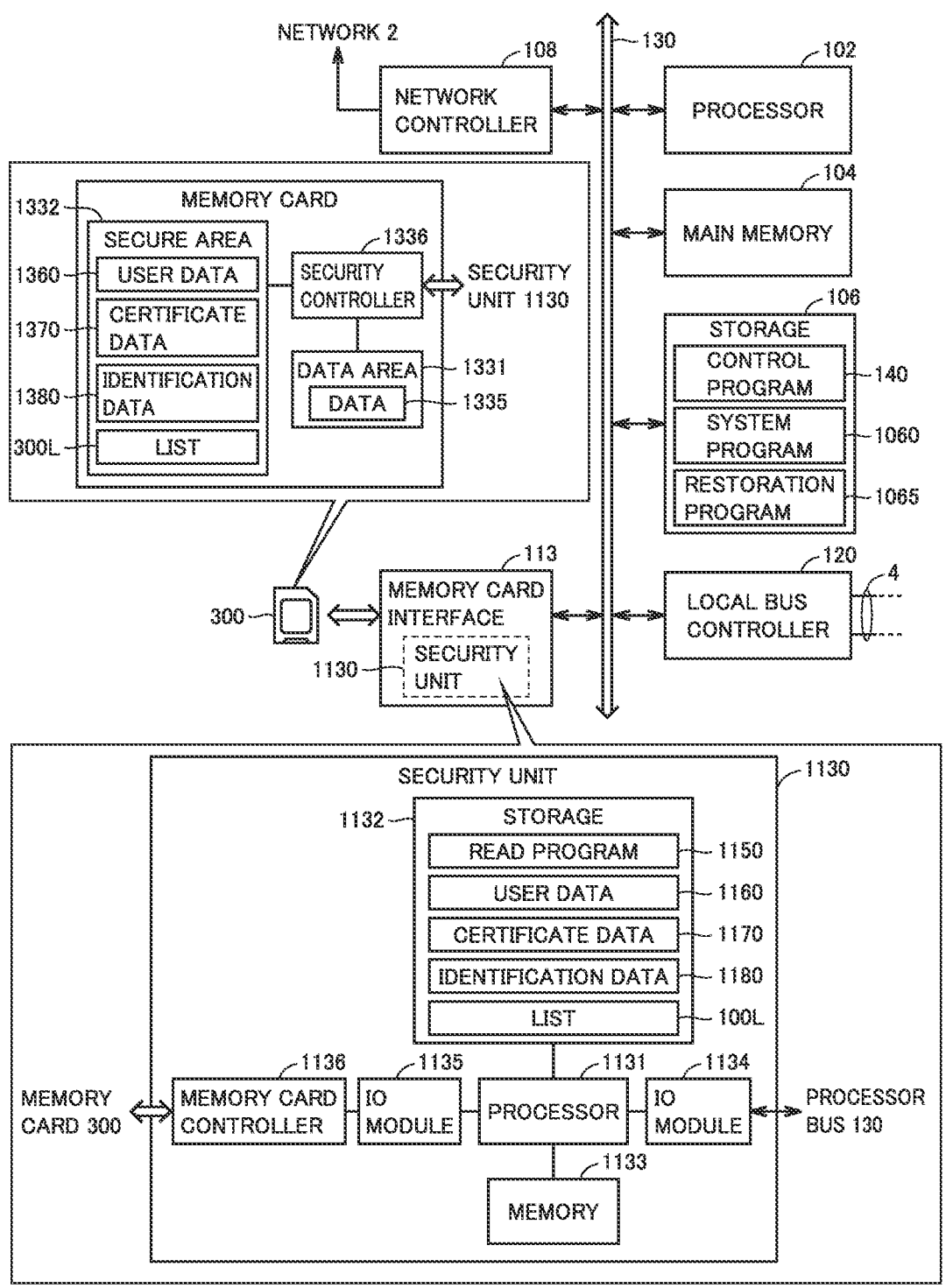
FIG. 2 is a block diagram that schematically illustrates exemplified hardware components of a PLC and a memory card configuration according to the embodiments.

FIG. 2 is a block diagram that schematically illustrates exemplified hardware components of PLC 100 and an exemplified configuration of memory card 300 according to the embodiments. As illustrated in FIG. 2, PLC 100 includes a processor 102, a main memory 104, a storage 106, a network controller 108 and a memory card interface 113. These components are interconnected through a processor bus 130.

Processor 102 is a computing unit configured to execute computations for control, and elements constituting this processor include a CPU (Central Processing Unit) and a GPU (Graphics Processing Unit). Specifically, processor 102 reads programs stored in storage 106 (for example, control program 140, system program 1060, restoration program 1065) and then expands and runs the read programs on main memory 104, so that predetermined processes for control are executed.

In FIG. 2 is presented an example in which functions required of PLC 100 are offered by prompting processor 102 to run predetermined programs. Instead, the functions thus offered may be implemented in part or in whole by using a dedicated hardware circuit (for example, ASIC or FPGA).

Main memory 104 may include a volatile storage device, for example, DRAM (Dynamic Random Access Memory) or SRAM (Static Random Access Memory). Storage 106 may include a non-volatile storage device(s), for example, HDD (Hard Disk Drive) and/or SSD (Flash Solid State Drive). In storage 106 are stored a system program 1060 that enables basic functions, a control program 140 developed correspondingly to a target to be controlled, for example, facility or machinery, and a restoration program 1065 used to restore PLC 100.

Network controller 108 transmits and receives data to and from optional information processors including support device 400 through network 2.

Memory card interface 113 is an interface for exclusive use with memory card 300 described herein as an example of removable recording media. Memory card interface 113 that received a predetermined access authentication is allowed to write data in memory card 300 and read various pieces of data (for example, backup data) from memory card 300.

Memory card interface 113 is loaded with a security unit 1130. Security unit 1130 is a security chip that permits or prohibits accesses made by processor 102 to memory card 300. This security unit is an example of the "reader" including a concealed logic for exclusive use. Memory card 300 according to the embodiments is a memory card highly guarded against unauthorized data accesses. This memory card can only be accessed from security unit 1130 alone. Thus, the level of security may be enhanced in regard to data accesses to memory card 300.

Security unit 1130 includes a processor 1131, a storage 1132, a memory 1133, an IO module 1134, an IO module 1135, and a memory card controller 1136.

Processor 1131 is a computing device in charge of computations for control and may include, for example, MPU (Micro Processing Unit). Specifically, processor 1131 reads programs stored in storage 1132 (for example, read program 1150) and then expands and runs the read program on memory 1133, so that predetermined processes for control are executed.

In FIG. 2 is presented an example in which functions required of security unit 1130 are offered by prompting processor 1131 to run predetermined programs.

Instead, the functions thus offered may be implemented in part or in whole by using a dedicated hardware circuit (for example, ASIC or FPGA).

Memory 1133 may include a volatile storage device, for example, DRAM or SRAM. Storage 1132 may include a non-volatile storage device, for example, flash memory. This storage is an example of the "storage region" in PLC 100. In storage 1132 are stored a read program 1150, a user data 1160, a certificate data 1170, an identification data 1180, and a list 100L.

Read program 1150 includes a program which is run to execute an access authentication process. Specifically describing this process, when, for example, an access request is outputted from processor 102 for data 1335 including the backup data stored in memory card 300, this read program determines whether the requested access to data 1335 in memory card 300 should be enabled. Then, the data is determined as accessible when a positive result is obtained but is determined as inaccessible when a negative result is obtained. User data 1160 includes pieces of information used to identify users in control system 1 (for example, account names, passwords).

Certificate data 1170 contains information used to prove that PLC 100 is an authorized member for control system 1. For example, certificate data 1170 contains information on certificates issued when the devices are authenticated by the original manufacturers as genuine products. Certificate data 1170 may otherwise contain information on certificates issued when the devices are authenticated by users or third parties like outside organizations, instead of the original manufacturers.

Identification data 1180 contains pieces of relevant information including the model code and the serial number of PLC 100. As described earlier, list 100L contains pieces of relevant information associated with the members.

IO module 1134 transmits and receives input and output data, through processor bus 130, to and from processor 1131 and processor 102. IO module 1135 transmits and receives input and output data, through memory card controller 1136, to and from processor 1131 and memory card 300.

Memory card controller 1136 activates a communication path leading to memory card 300 when accesses made by processor 102 to memory card 300 are enabled based on the access authentication process.

(b2: Memory Card 300)

As illustrated in FIG. 2, memory card 300 includes a data area 1331, a secure area 1332, and a security controller 1336. Data area 1331 is a storage region in which data 1335 including the backup data is storable. Optionally, data 1335 may be encrypted with a key, for example, with a public key and then stored in data area 1331.

Secure area 1332 is a concealed storage region that requires any device trying to access this region to be authenticated beforehand. This secure area is an example of the "storage region" in memory card 300. In secure area 1332, a user data 1360, a certificate data 1370, an identification data 1380, and a list 300L are stored.

User data 1360 contains pieces of information used to identify users in control system 1 (for example, account names, passwords). Certificate data 1370 contains information used to prove that memory card 300 is an authorized device for control system 1. For example, certificate data 1370 contains information on certificates issued when the devices are authenticated by the original manufacturers as genuine products. Certificate data 3170 may otherwise contain information on certificates issued when the devices are authenticated by users or third parties like outside organizations, instead of the original manufactures.

Identification data 1380 contains pieces of relevant information including the model code and the serial number of memory card 300. As described earlier, list 300L contains pieces of relevant information associated with the members.

Security controller 1336 activates a communication path between security unit 1130 and area 1331 when accesses made by processor 102 to data area 1335 are enabled based on the access authentication process described earlier. Memory card 300 according to the embodiments can only be accessed from security unit 1130 alone of PLC 100 including the concealed logic for exclusive use. Supposing there is another read-only device allowed to access memory card 300, such a device is still not allowed to access data 1335 stored in data area 1331 of memory card 300 unless the device is authenticated beforehand based on the access authentication process.

(b3: Units 200)

Figure 3:
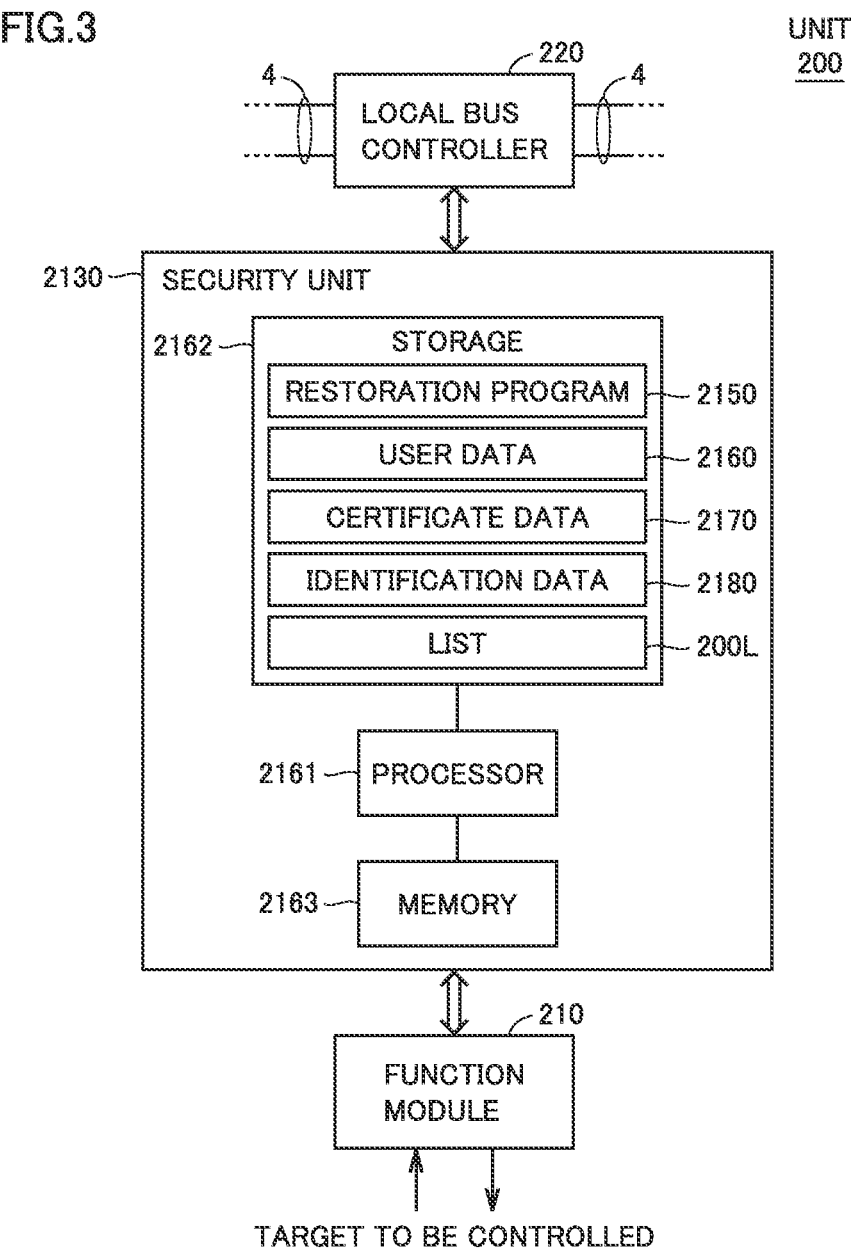
FIG. 3 is a block diagram that schematically illustrates exemplified hardware components of a unit according to the embodiments.

FIG. 3 is a block diagram that schematically illustrates exemplified hardware components of units 200 according to the embodiments. As illustrated in FIG. 3, units 200 each include a function module 210, a local bus controller 220, and a security unit 2130.

Function module 210 provides a function(s) suitable for a job(s) to be done by each unit 200. In case units 200 are each a digital input unit, function module 210 has an input circuit and a detecting circuit for digital signals, for example, photocouplers. In case units 200 are each a servo driver, function module 210 has, for example, a track computing logic and a command generating logic.

Local bus controller 220 transmits and receives data, through local bus 4, to and from PLC 100 or other units 200 which this bus controller is connected to.

Security unit 2130 is a security chip used to execute the access authentication process and is allowed to intercommunicate with function module 210 and local bus controller 220. Security unit 2130 includes a processor 2161, a storage 2162 and a memory 2163.

Processor 2161 is a computing unit in charge of computations for control and may include, for example, MPU. Processor 2161 reads programs stored in storage 2162 (for example, restoration program 2150) and then expands and runs the read program on memory 2163, so that predetermined processes for control are executed.

In FIG. 3 is presented an example in which functions required of units 200 are offered by prompting processor 2161 to run predetermined programs. Instead, the functions thus offered may be implemented in part or in whole by using a dedicated hardware circuit (for example, ASIC or FPGA).

Memory 2163 may include a volatile storage device, for example, DRAM or SRAM. Storage 2162 may include a non-volatile storage device, for example, flash memory. This storage is an example of the "storage region" in unit 200. In storage 2162 are stored a restoration program 2150, a user data 2160, a certificate data 2170, an identification data 2180, and a list 200L.

Restoration program 2150 contains programs run to restore unit 200. User data 2160 contains pieces of information used to identify users in control system 1 (for example, account names, passwords). Certificate data 2170 contains information used to prove that units 200 are authorized devices for control system 1. For example, certificate data 2170 contains information on certificates issued when the devices are authenticated by the original manufacturers as genuine products. Certificate data 2170 may otherwise contain information on certificates issued when the devices are authenticated by users or third parties like outside organizations, instead of the original manufactures.

(b4: Support Device 400)

Figure 4:
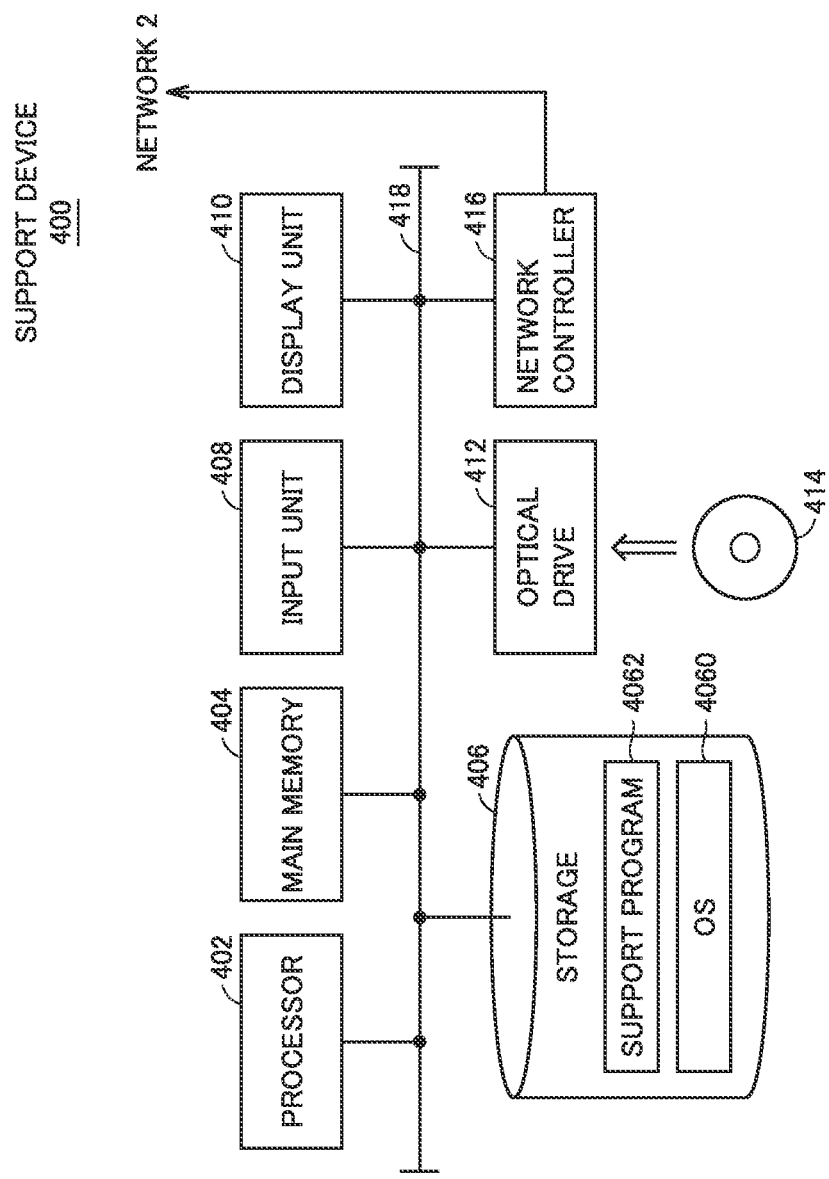
FIG. 4 is a block diagram that schematically illustrates exemplified hardware components of a support device according to the embodiments.

FIG. 4 is a block diagram that schematically illustrates exemplified hardware components of support device 400 according to the embodiments. Support device 400 is implemented by, for example, prompting a computer that complies with general-purpose architectures to execute a program.

As illustrated in FIG. 4, support device 400 includes a processor 402, a main memory 404, a storage 406, an input unit 408, a display unit 410, an optical drive 412 and a network controller 416. These components are interconnected through a processor bus 418.

Processor 402 may include, for example, CPU and GPU. This processor reads programs stored in storage 406 (for example, OS 4060 and support program 4062) and then expands and runs the read program on main memory 404, so that predetermined processes for control are executed.

In FIG. 4 is presented an example in which functions required of support device 400 are offered by prompting processor 402 to run predetermined programs. Instead, the functions thus offered may be implemented in part or in whole by using a dedicated hardware circuit (for example, ASIC or FPGA).

Main memory 404 may include a volatile storage device, for example, DRAM or SRAM. Storage 406 may include a volatile storage device, for example, HDD or SSD.

In addition to OS 4060 that enables basic functions, support program 4062 is stored in storage 406. This support program provides functions required of support device 400. Support program 4062 prompts a computer to operate as support device 400.

Input unit 408 may include a keyboard and a mouse to receive inputs from a user. Display unit 410 includes a display, indicators and a printer, so that processing results of processor 402, for example, are outputted.

Network controller 416 transmits and receives data, through network 2, to and from optional external devices, for example, PLC 100.

Support device 400 is equipped with optical drive 412. Programs that are non-transitorily stored in a computer-readable recording medium 414 (for example, optical recording medium such as DVD (Digital Versatile Disc)) are read from this recording medium and installed into, for example, storage 406.

Support program 4062 run by support device 400, for example, may be installed through computer-readable recording medium 414 or may be downloaded from, for example, a network server and then installed. The functions provided by support device 400 according to the embodiments may be feasible by leveraging some of the modules provided by OS.

<C. Example of Serial Verification>

Figure 5:
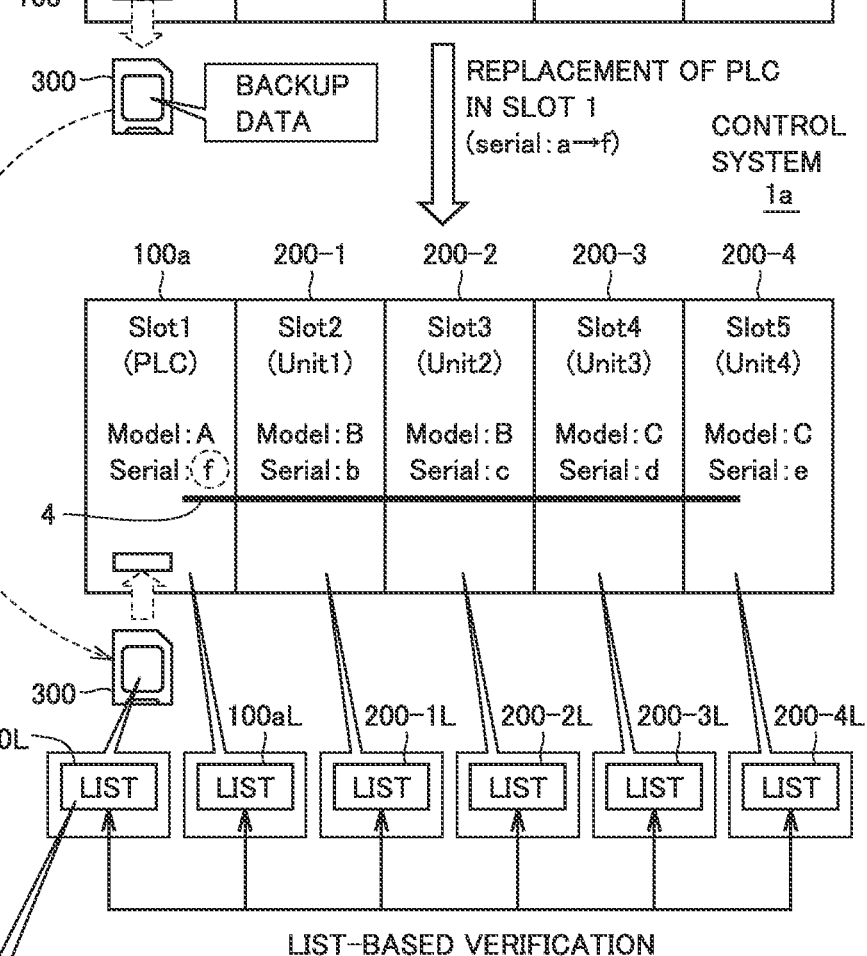
FIG. 5 is a diagram that schematically illustrates an exemplified serial verification when data is duly accessed in a control system according to the embodiments.
Figure 7:
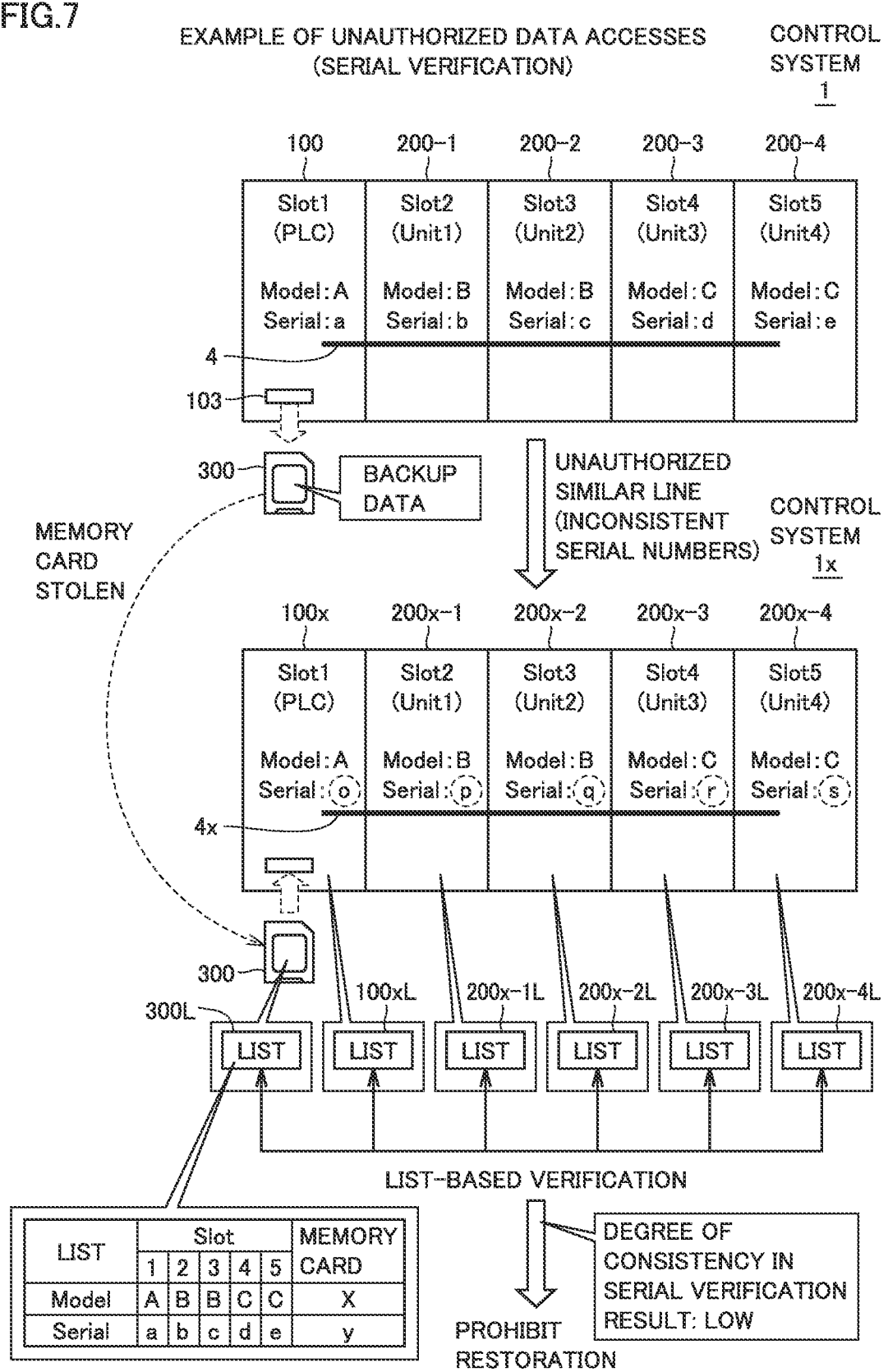
FIG. 7 is a diagram that schematically illustrates an exemplified serial verification when data is unduly accessed in the control system according to the embodiments.

Referring to FIGS. 5 to 7, an exemplified verification is hereinafter described, in which serial numbers are used for verification in the access authentication process (hereinafter, may be referred to as "serial verification").

(c1. Example of Serial Verification for Authorized Data Accesses)

FIG. 5 is a diagram that schematically illustrates an exemplified serial verification when data is duly accessed in control system 1 according to the embodiments. FIG. 6 is a diagram that schematically illustrates an example of serial verification assessment in control system 1 according to the embodiments.

As for PLC 100 in slot 1 illustrated in the example of FIG. 5, "A" as model code and "a" as serial number are assigned to this device in control system 1. As for unit 200-1 in slot 2 illustrated in this drawing, "B" as model code and "b" as serial number are assigned to this device. As for unit 200-2 in slot 3 illustrated in this drawing, "B" as model code and "c" as serial number are assigned to this device. As for unit 200-3 in slot 4 illustrated in this drawing, "C" as model code and "d" as serial number are assigned to this device. As for unit 200-4 in slot 5 illustrated in this drawing, "C" as model code and "e" as serial number are assigned to this device. In control system 1 thus configured, the backup data of PLC 100 is stored in memory card 300.

It is assumed that, under such circumstances, PLC 100 in slot 1 breaks down, and a control system 1*a* should desirably be newly built by replacing failed PLC 100 with a PLC 100*a*. As for PLC 100*a*, "A" as model code and "f" as serial number are assigned to this device. Thus, PLC 100*a* newly introduced to replace PLC 100 has the same model code as that of PLC 100 and a serial number that differs from that of PLC 100.

When memory card 300 is inserted in PLC 100*a* to restore the backup data of PLC 100, the access authentication process (serial authentication) is carried out by memory card 300, PLC 100*a* and units 200-1 to 200-4.

It is assumed that the same contents are stored in the lists of the different members; list 300L of memory card 300, list 200-1L of unit 200-1, list 200-2L of unit 200-2, list 200-3L of unit 200-3, and list 200-4L of unit 200-4. PLC 100a is a newly introduced device, list 100aL of which is thus containing no information (blank).

Memory card 300 obtains the serial number "f" as identification data from PLC 100a in slot 1 and verifies the obtained serial number against the serial number "a" for slot 1 stored in its own list 300L. Then, memory card 300 determines that the serial numbers are inconsistent. Memory card 300 obtains the serial numbers "b", "c", "d" and "e" as identification data from units 200 of slots 2 to 5 and verifies the obtained serial numbers against the serial numbers "b", "c", "d" and "e" for slots 2 to 5 stored in its own list 300L. Then, memory card 300 determines that the serial numbers obtained from the different sources are consistent. As a result of the verification by memory card 300, the serial numbers for slot 1 alone are determined as inconsistent.

On the condition that, for example, memory card 300 sets the bit "0" in its own table when the verification result indicates consistency and sets the bit "1" when the verification result indicates inconsistency, as illustrated in FIG. 6, the bit "1" is set for slot 1 alone and the bit "0" is set for the other members based on the verification result.

PLC 100a obtains the serial number "y" as identification data from memory card 300 and verifies the obtained serial number against the serial number for this memory card stored in its own list 100aL. Since list 100aL is containing no information (blank), PLC 100a determines that the serial numbers are inconsistent. PLC 100a obtains the serial numbers "b", "c", "d" and "e" as identification data from units 200 of slots 2 to 5 and verifies the obtained serial numbers against the serial numbers for slots 2 to 5 stored in its own list 100aL. Because of list 100aL containing no information (blank), PLC 100a determines that the serial numbers are inconsistent. As a result of the verification by PLC 100a, the serial numbers for memory card 300 and slots 2 to 5 are determined as inconsistent.

On the condition that, for example, PLC 100a in slot 1 sets the bit "0" in its own table when the verification result indicates consistency and sets the bit "1" when the verification result indicates inconsistency, as illustrated in FIG. 6, the bit "1" is set for slots 2 to 5 and memory card 300 based on the verification result.

Units 200-1 to 200-4 each obtains the serial number "y" as identification data from memory card 300 and verify the obtained serial number against the serial number "y" stored in their own lists 200-1L to 200-4L. Then, units 200-1 to 200-4 determine that the serial numbers are consistent. Units 200-1 to 200-4 obtain the serial number "1" as identification data from PLC 100a and verify the obtained serial number against the serial number "a" for slot 1 stored in their own lists 200-1L to 200-4L. Then, units 200-1 to 200-4 determine that the serial numbers are inconsistent. Units 200 each obtain the serial numbers as identification data from the other units 200 and verify the obtained serial numbers against the serial numbers for the other units 200 stored in their own lists. Then, units 200 determine that the serial numbers are consistent. As a result of the verification by units 200-1 to 200-4, the serial numbers for slot 1 alone are determined as inconsistent.

On the condition that, for example, units 200 of slots 2 to 5 set the bit "0" in their own tables when the verification result indicates consistency and set the bit "1" when the verification result indicates inconsistency, as illustrated in FIG. 6, the bit "1" is set for slot 1 alone and the bit "0" is set for the other members based on the verification result.

After the serial numbers in regard to all of the members are thus verified, the serial numbers in slot 1 in regard to memory card 300 and units 200 alone are determined as inconsistent. As a result, PLC 100a of slot 1 is determined by many of the members as being newly introduced, which can be rephrased that none of the other members has been replaced or changed. The serial number-based verification result thus indicates a high degree of consistency. Based on the rule of majority vote, therefore, memory card 300 enables PLC 100a to access and restore the backup data.

The verification results obtained by the members are transmitted to the other members, so that the table illustrated in FIG. 6 can be shared among all of the members. One of the members (for example, member that first acquired the verification results of the members) determines whether the verification results satisfy a predetermined condition. Specifically, the bits set by the members are added as illustrated in FIG. 6, a result of which is then divided by the number of members to calculate an average value (%). Based on the calculated average values of the members, it is determined whether any device with an average value greater than 50% is among the members. In the illustrated example, the average value exceeds 50% in slot 1 alone.

In case three or more members have average values greater than 50%, i.e., three or more members are determined as being replaced or changed by the members having average values of 50% or more, the verification result is determined as indicating a low degree of consistency, disallowing data accesses. In case less than three members have average values greater than 50%, i.e., less than three members are determined as being replaced or changed by the members having average values of 50% or more, the verification result is determined as being acceptable.

Insofar as the verification result is thus found acceptable, memory card 300 enables PLC 100a to access the backup data.

(c2. Example of Serial Verification for Unauthorized Data Accesses)

FIG. 7 is a diagram that schematically illustrates an exemplified serial verification when data is unduly accessed in control system 1 according to the embodiments.

As for PLC 100 in slot 1 illustrated in the example of FIG. 7, "A" as model code and "a" as serial number are assigned to this device in control system 1. As for unit 200-1 in slot 2 illustrated in this drawing, "B" as model code and "b" as serial number are assigned to this device. As for unit 200-2 in slot 3 illustrated in this drawing, "B" as model code and "c" as serial number are assigned to this device. As for unit 200-3 in slot 4 illustrated in this drawing, "C" as model code and "d" as serial number are assigned to this device. As for unit 200-4 in slot 5 illustrated in this drawing, "C" as model code and "e" as serial number are assigned to this device. In control system 1 thus configured, the backup data of PLC 100 is stored in memory card 300.

It is assumed that, under such circumstances, data is restored in a control system 1x including an unauthorized line built after memory card 300 is stolen. For example, PLC 100x of slot 1 and units 200x-1 to 200x-4 of slots 2 to 5 are interconnected through a local bus 4x in a manner that these devices are allowed to communicate with one another.

As for unit PLC 100x in slot 1, "A" as model code and "o" as serial number are assigned to this device. As for unit 200x-1 in slot 2, "B" as model code and "p" as serial number are assigned to this device. As for unit 200x-2 in slot 3, "B" as model code and "q" as serial number are assigned to this device. As for unit 200x-3 in slot 4, "C" as model code and "r" as serial number are assigned to this device. As for unit 200x-4 in slot 5, "C" as model code and "s" as serial number are assigned to this device.

When memory card 300 is inserted in PLC 100x to unduly restore the backup data of PLC 100, the data in memory card 300 is not accessible by PLC 100x without the access authentication process unless a program required to run this process has been pre-installed in this device. This may prevent the risk of data leakage.

Supposing that the respective members are loaded with such an access authentication program, memory card 300, PLC 100x and units 200x-1 to 200x-4 carry out the access authentication process (serial authentication).

Memory card 300 obtains the serial number "o" as identification data from PLC 100x in slot 1 and verifies the obtained serial number against the serial number "a" for slot 1 stored in its own list 300L. Then, memory card 300 determines that the serial numbers are inconsistent. Memory card 300 obtains the serial numbers "p", "q", "r" and "s" as identification data from units 200x of slots 2 to 5 and verifies the obtained serial numbers against the serial numbers "b", "c", "d" and "e" for slots 2 to 5 stored in its own list 300L. Then, memory card 300 determines that the serial numbers obtained are inconsistent. As a result of the verification by memory card 300, the serial numbers are determined as inconsistent for all of the slots 1 to 5.

In the serial verification employed in this embodiment, the serial numbers of and obtained from the members are verified against the serial numbers of the members stored in list 300L of memory card 300, and the degree of consistency is determined as low when the number of members with their serial numbers being determined as consistent does not exceed a certain number (for example, three). In the example illustrated in FIG. 7, the serial number-based verification result thus indicates a low degree of consistency, therefore, memory card 300 does not enable PLC 100x to access or restore the backup data.

<D. Example of Model Verification>

Referring to FIGS. 8 to 10, an exemplified verification is hereinafter described, in which model codes are used for verification in the access authentication process (hereinafter, may be referred to as "model verification").

(d1. Example of Model Verification for Authorized Data Accesses)

FIG. 8 is a diagram that schematically illustrates an exemplified model verification when data is duly accessed in control system 1 according to the embodiments. FIG. 9 is a diagram that schematically illustrates an example of model verification assessment in control system 1 according to the embodiments.

As for PLC 100 in slot 1 illustrated in the example of FIG. 8, "A" as model code and "a" as serial number are assigned to this device in control system 1. As for unit 200-1 in slot 2 illustrated in this drawing, "B" as model code and "b" as serial number are assigned to this device. As for unit 200-2 in slot 3 illustrated in this drawing, "B" as model code and "c" as serial number are assigned to this device. As for unit 200-3 in slot 4 illustrated in this drawing, "C" as model code and "d" as serial number are assigned to this device. As for unit 200-4 in slot 5 illustrated in this drawing, "C" as model code and "e" as serial number are assigned to this device. In control system 1 thus configured, the backup data of PLC 100 is stored in memory card 300.

It is assumed, under such circumstances, to newly build a control system 1b by duplicating a line configured similarly to that of control system 1. For example, PLC 100b of slot 1 and units 200b-1 to 200b-4 of slots 2 to 5 are interconnected through a local bus 4b in a manner that these devices are allowed to communicate with one another.

As for unit PLC 100b in slot 1, "A" as model code and "g" as serial number are assigned to this device. As for unit 200b-1 in slot 2, "B" as model code and "h" as serial number are assigned to this device. As for unit 200b-2 in slot 3, "B" as model code and "i" as serial number are assigned to this device. As for unit 200b-3 in slot 4, "C" as model code and "j" as serial number are assigned to this device. As for unit 200b-4 in slot 5, "C" as model code and "k" as serial number are assigned to this device.

When memory card 300 is inserted in PLC 100b to restore the backup data of PLC 100, the access authentication process (model authentication) is carried out by memory card 300, PLC 100b and units 200b-1 to 200b-4.

It is assumed that the same contents are stored in the lists of the different members; list 300L of memory card 300, list 200b-1L of unit 200b-1, list 200b-2L of unit 200b-2, list 200b-3L of unit 200b-3, and list 200b-4L of unit 200b-4.

Memory card 300 obtains the model code "A" as identification data from PLC 100b in slot 1 and verifies the obtained model code against the model code "A" for slot 1 stored in its own list 300L. Then, memory card 300 determines that the model codes obtained from the different sources are consistent. Memory card 300 obtains the model codes "B", "B", "C" and "C" as identification data from units 200 of slots 2 to 5 and verifies the obtained model codes against the model codes "B", "B", "C" and "C" for slots 2 to 5 stored in its own list 300L. Then, memory card 300 determines that the model codes obtained from the different sources are consistent. Based on the verification result obtained by memory card 300, the model codes are determined as consistent for all of the slots 1 to 5.

On the condition that, for example, memory card 300 sets the bit "0" in its own table when the verification result indicates consistency and sets the bit "1" when the verification result indicates inconsistency, as illustrated in FIG. 9, the bit "0" is set for slots 1 to 5 based on the verification result.

PLC 100b obtains the model code "X" as identification data from memory card 300 and verifies the obtained model code against the model code "X" for this memory card stored in its own list 100bL. Then, PLC 100b determines that the model codes obtained from the different sources are consistent. PLC 100b obtains the model codes "B", "B", "C" and "C" as identification data from units 200b of slots 2 to 5 and verifies the obtained model codes against the model codes "B", "B", "C" and "C" for slots 2 to 5 stored in its own list 100bL. Then, PLC 100b determines that the model codes obtained from the different sources are consistent. Based on the verification result obtained by PLC 100b, the model codes are determined as consistent for all of the slots 1 to 5.

On the condition that, for example, PLC 100b in slot 1 sets the bit "0" in its own table when the verification result indicates consistency and sets the bit "1" when the verification result indicates inconsistency, as illustrated in FIG. 9, the bit "0" is set for slots 2 to 5 and memory card 300 based on the verification result.

Units 200b-1 to 200b-4 each obtains the model code "X" as identification data from memory card 300 and verifies the obtained model code against the model code "X" for this memory card stored in a respective one of their own lists 200b-1L to 200b-4L. Then, units 200b-1 to 200b-4 determine that the model codes obtained from the different sources are consistent. Units 200b-1 to 200b-4 each obtains the model code "A" as identification data from PLC 100b and verifies the obtained model code against the model code "A" for slot 1 stored in a respective one of their own lists 200b-1L to 200b-4L. Then, units 200b-1 to 200b-4 determine that the model codes obtained from the different sources are consistent. Units 200b each obtains the model codes as identification data from the other units 200b and verifies the obtained model codes against the model codes for the other units 200b stored in their own lists. Then, units 200b determine that the model codes are consistent. Based on the verification result obtained by units 200b-1 to 200b-4, the model codes are determined as consistent for all of the slots 1 to 5.

On the condition that, for example, units 200b in slots 2 to 5 each sets the bit "0" in its own table when the verification result indicates consistency and sets the bit "1" when the verification result indicates inconsistency, as illustrated in FIG. 9, the bit "0" is set for the respective members based on the verification result.

After the model codes in regard to all of the members are thus verified, the model codes for all of memory card 300 and slots 1 to 5 are determined as consistent. As a result, it is determined by many of the members that the members including PLC 100b in slot 1 are mostly not replaced or changed. The model code-based verification result thus indicates a high degree of consistency. Based on the rule of majority vote, therefore, memory card 300 enables PLC 100b to access and restore the backup data.

The verification results obtained by the members are transmitted to the other members, so that the table illustrated in FIG. 9 can be shared among all of the members. One of the members (for example, member that first acquired the verification results of the members) determines whether the verification results satisfy a predetermined condition. Specifically, the bits set by the members are added as illustrated in FIG. 9, a result of which is then divided by the number of members to calculate an average value (%). Based on the calculated average values of the members, it is determined whether any device with an average value greater than 50% is among the members. In the illustrated example, none of the members has an average value greater than 50%.

In case three or more members have average values greater than 50%, i.e., three or more members are determined as being replaced or changed by the members having average values of 50% or more, the verification result is determined as indicating a low degree of consistency, disallowing data accesses. In case less than three members have average values greater than 50%, i.e., less than three members are determined as being replaced or changed by the members having average values of 50% or more, the verification result is determined as being acceptable.

Insofar as the verification result is thus found acceptable, memory card 300 enables PLC 100a to access the backup data.

In the example illustrated in FIG. 8 in which the model codes are duplicated from the same line, the serial numbers of the units and PLC are changed. Supposing that the serial verification illustrated in FIGS. 5 and 6 is employed in the example of FIG. 8, it is determined by many of the members that the members including the PLC in slot 1 are mostly replaced or changed. Memory card 300, therefore, does not enable accesses by the PLC to the backup data.

In the verification using the model codes instead of the serial numbers unique to the devices, accesses to the backup data stored in memory card 300 are enabled in regard to the members of the same model code having different serial numbers, as illustrated in the example of FIGS. 8 and 9. This may ensure a good balance between user-friendliness and better security in data accesses to memory card 300.

(d2. Example of Model Verification for Unauthorized Data Accesses)

FIG. 10 is a diagram that schematically illustrates an exemplified model verification when data is unduly accessed in control system 1 according to the embodiments.

As for PLC 100 in slot 1 illustrated in the example of FIG. 10, "A" as model code and "a" as serial number are assigned to this device in control system 1. As for unit 200-1 in slot 2 illustrated in this drawing, "B" as model code and "b" as serial number are assigned to this device. As for unit 200-2 in slot 3 illustrated in this drawing, "B" as model code and "c" as serial number are assigned to this device. As for unit 200-3 in slot 4 illustrated in this drawing, "C" as model code and "d" as serial number are assigned to this device. As for unit 200-4 in slot 5 illustrated in this drawing, "C" as model code and "e" as serial number are assigned to this device. In control system 1 thus configured, the backup data of PLC 100 is stored in memory card 300.

It is assumed that, under such circumstances, data is restored in a control system 1y including an unauthorized line built after memory card 300 is stolen. For example, PLC 100y of slot 1, units 200y-1 to 200y-3 of slots 2 to 5 are interconnected through a local bus 4y in a manner that these devices are allowed to communicate with one another.

As for unit PLC 100y in slot 1, "D" as model code and "k" as serial number are assigned to this device. As for unit 200y-1 in slot 2 illustrated in this drawing, "E" as model code and "l" as serial number are assigned to this device. As for unit 200y-2 in slot 3 illustrated in this drawing, "E" as model code and "m" as serial number are assigned to this device. As for unit 200y-3 in slot 4 illustrated in this drawing, "F" as model code and "n" as serial number are assigned to this device. Slot 5 is empty with no unit.

When memory card 300 is inserted in PLC 100y to unduly restore the backup data of PLC 100, the data in memory card 300 is not accessible by PLC 100y without the access authentication process unless a program required to run this process has been pre-installed in this device. This may prevent the risk of data leakage.

Supposing that the respective members are loaded with the program installed to run the access authentication process, memory card 300, PLC 100y and units 200y-1 to 200y-3 carry out the access authentication process (model authentication).

Memory card 300 obtains the model code "D" as identification data from PLC 100y in slot 1 and verifies the obtained model code against the model code "A" for slot 1 stored in its own list 300L. Then, memory card 300 determines that the model codes are inconsistent. Memory card 300 obtains the model codes "E", "E" and "F" as identification data from units 200y of slots 2 to 4 and verifies the obtained model codes against the model codes "B", "B" and "C" for slots 2 to 4 stored in its own list 300L. Then, memory card 300 determines that the model codes are inconsistent. The identification data is not obtainable from slot 5 or verifiable against the model code "C" for slot 5 stored in its own list 300L. Then, memory card 300 determines that the lack of consistency. Based on the verification result obtained by memory card 300, the model codes are determined as inconsistent for all of the slots 1 to 5.

In the model verification employed in this embodiment, the model codes of and obtained from the members are verified against the model codes of the members stored in list 300L of memory card 300, and the degree of consistency is determined as low when the number of members with their model codes being determined as consistent does not exceed a certain number (for example, three). In the example illustrated in FIG. 10, the model code-based verification result thus indicates a low degree of consistency, therefore, memory card 300 does not enable PLC 100y to access or restore the backup data.

<E. Example of Setting Screen in Support Device 400>

FIG. 11 is a diagram that schematically illustrates an exemplified setting screen of support device 400 according to the embodiments. As illustrated in FIG. 11, support device 400 provides a user interface that allows users to input various settings for the access authentication process.

Specifically, support device 400 has a screen 450 which includes the following fields; user information 451 in which user information is settable, user authentication method 452 in which a user authentication method is settable, password 453 in which a password is settable, a verification method 454 in which a verification method is settable, security level 455 in which a level of security is settable, and applicable range 456 in which a range of applicable devices is settable.

A user inputs an account name of his/her own choice in the field of user information 451 and is thus able to set the account name as his/her user information. The user can select and set a user authentication method of his/her own choice in the field of user authentication method 452. In the embodiments disclosed herein, face authentication or biometric authentication (for example, fingerprint authentication), though not illustrated in the drawings, may be selected instead of the password authentication. The user who selected the password authentication can input a password his/her own choice in the field of password 453.

The user can select and set a verification method of his/her own choice in the field of verification method 454. In the embodiments disclosed herein, the user is given a choice between the serial verification and the model verification. Thus, support device 400 according to the embodiments disclosed herein provides a user interface that allows users to select either one of the serial verification and the model verification.

Then, the user is allowed to select, using support device 400, which one of the following is desirably verified; serial numbers used to individually identify the members, and model codes of the members. Thus, the control system may be successfully built in a suitable manner for a level of security required of the system.

Instead of requesting the user to select one of two options; the model verification and the serial verification, support device 400 may offer the user such an option that both of the model and serial verifications are available. In this instance, control system 1 according to the embodiments disclosed herein may determine whether the devices are enabled to access the data in memory card 300 using both of the model verification and the serial verification.

In the field of security level 455, the user can set a level of security required of control system 1. Specifically, the user can set the number of devices, among all of the devices, subject to the serial verification or the model verification in the access authentication process. While all of the device should desirably be verified in view of security, the devices to be verified may be decreased in order to shorten processing time or lessen the workload of complex processes. In the embodiments disclosed herein, the number of devices to be verified may desirably be a total number of devices from which "1" has been subtracted. Thus, support device 400 according to the embodiments disclosed herein provides a user interface that allows users to set the number of devices to be verified.

Then, the user is allowed to select and set, using support device 400, how many devices are desirably verified. Thus, the control system may be successfully built in a suitable manner for a level of security required of the system.

The user can set, in the field of applicable range 456, a range of applicable members subject to the serial verification and/or the model verification in the access authentication process. In the embodiments disclosed herein, the user may select, as a range of applicable devices, PLC 100 and the devices connected to PLC 100 through the local bus 4, or may further select, in addition to these devices, tools like network 2 and support device 400. Thus, support device 400 according to the embodiments disclosed herein provides a user interface that allows users to set the range of applicable devices.

Then, the user is allowed to set, using support device 400, the range of applicable devices. Thus, the control system may be successfully built in a suitable manner for a level of security required of the system.

<F. Example of Access Authentication Process>

An example of the access authentication process executed in control system 1 according to the embodiments disclosed herein is hereinafter described referring to FIGS. 12 and 13.

(f1. Example of Access Authentication Process Using Serial Verification)

FIG. 12 is a sequence diagram that illustrates an exemplified access authentication process using the serial verification executed in control system 1 according to the embodiments disclosed herein. In FIG. 12 is illustrated the access authentication process (serial verification) in the example of FIGS. 5 and 6. Specifically, this drawing illustrates the data restoration after PLC 100 with the serial number of "a" is replaced with PLC 100a with the serial number of "f" in slot 1.

Though not illustrated in the drawing, when memory card 300 is inserted in PLC 100a of slot 1 and a predetermined switch is turned on, the user is requested to input his/her user data on the screen of support device 400. When a user inputs, as user data, his/her user information (for example, account name) and password, support device 400 transmits the user data to PLC 100a of slot 1, memory card 300 and units 200 of slots 2 to 5, as illustrated in FIG. 12 (steps 1), 2), 3)).

PLC 100a of slot 1 verifies user data 1160 retained by itself against the user data obtained from support device 400. When these two pieces of user data obtained from the different sources are consistent with each other, PLC 100a transmits certificate data 1170 retained by itself to units 200 of slots 2 to 5 (step 4)). PLC 100a of slot 1 does not transmit certificate data 1170 unless the user data is authenticated.

When units 200 of slots 2 to 5 determine that PLC 100a is a genuine product supplied by the original manufacturer based on certificate data 1170, these units 200 transmit, to PLC 100a, authentication data indicating that PLC 100a has been authenticated (step 5)). Units 200 of slots 2 to 5 do not transmit the authentication data to PLC 100a unless PLC 100a is determined as being a genuine product supplied by the original manufacturer.

Units 200 of slots 2 to 5 verify user data 2160 retained by themselves against the user data obtained from support device 400. When these two pieces of user data obtained from the different sources are consistent with each other, units 200 transmit certificate data 2170 retained by themselves to PLC 100a of slot 1 (step 6)). Units 200 of slots 2 to 5 do not transmit certificate data 2170 unless the user data is authenticated.

Memory card 300 verifies user data 1360 retained by itself against the user data obtained from support device 400.

When these two pieces of user data obtained from the different sources are consistent with each other, memory card 300 transmits certificate data 1370 retained by itself to PLC 100*a* of slot 1 (step 7)). Memory card 300 does not transmit certificate data 1370 unless the user data is authenticated.

When PLC 100*a* of slot 1 determines that units 200 of slots 2 to 5 are genuine products supplied by the original manufacturers based on certificate data 2170, PLC 100*a* transmits, to units 200, authentication data indicating that units 200 have been authenticated (step 8)). PLC 100*a* of slot 1 does not transmit the authentication data unless units 200 of slots 2 to 5 are determined as being genuine products supplied by the original manufacturers.

When PLC 100*a* of slot 1 determines that memory card 300 is a genuine product supplied by the original manufacturer based on certificate data 1370, PLC 100*a* transmits, to memory card 300, authentication data indicating that memory card 300 has been authenticated (step 9)). PLC 100*a* of slot 1 does not transmit the authentication data unless memory card 300 is determined as being a genuine product supplied by the original manufacturer.

When the processes in steps 1) to 9) are all completed, PLC 100*a* in slot 1 has been authenticated by units 200 in slots 2 to 5, units 200 in slots 2 to 5 have been authenticated by PLC 100*a* in slot 1, and memory card 300 has been authenticated by PLC 100*a* in slot 1.

For the serial verification, PLC 100*a* in slot 1 thereafter transmits identification data 1180 (serial number "1") retained by itself to units 200 in slots 2 to 5 (step 10)). For the serial verification, PLC 100*a* in slot 1 thereafter transmits identification data 1180 (serial number "f") retained by itself to memory card 300 (step 11)).

For the serial verification, units 200 in slots 2 to 5 thereafter transmit identification data 2180 (serial numbers "b", "c", "d" and "e") retained by themselves to memory card 300 (step 12)). For the serial verification, memory card 300 thereafter transmits identification data 1380 (serial number "y") retained by itself to units 200 in slots 2 to 5 (step 13)). For the serial verification, units 200 in slots 2 to 5 thereafter transmit identification data 2180 retained by themselves to the other units 200 (step 14)).

As a result of the processes in steps 10) to 14), memory card 300, PLC 100*a* in slot 1 and units 200 in slots 2 to 5 obtain the pieces of identification data of the members (serial numbers).

Then, memory card 300, PLC 100*a* in slot 1 and units 200 in slots 2 to 5 verify the obtained identification data (serial numbers) of the members against the serial numbers of the members stored in the lists retained by themselves (step 15)).

As described referring to the examples of FIGS. 5 and 6, when the degree of consistency in the serial number-based verification result is determined as high by one of the members (for example, member that first acquired the verification results of the members), memory card 300 enables PLC 100*a* to access the backup data and transmits the backup data to PLC 100*a* in slot 1 (step 16)).

Then, the members update their own lists based on the pieces of identification data (serial numbers) obtained from the other members (step 17)). The lists retained by the members are thus updated into the latest data.

After that, PLC 100*a* of slot 1 restores the data based on the backup data obtained from memory card 300 (step 18)).

In the example illustrated in FIG. 12, the backup data is transmitted from memory card 300 to PLC 100*a* of slot 1 when the degree of consistency in the model verification result is determined as high. Instead, the backup data may be transmitted from memory card 300 to PLC 100*a* of slot 1 after PLC 100*a*, memory card 300 and units 200 are mutually authenticated. In this instance, PLC 100*a* of slot 1 may be prohibited from restoring the data unless the degree of consistency in the model verification result is determined as high.

When memory card 300 is received by PLC 100*a*, accesses to the backup data stored in memory card 300 are enabled only when the degree of consistency is determined as high among the members in the serial number verification results obtained by any members but PLC 100*a*. This may ensure a higher level of security without compromising user-friendliness in accesses to the data stored in removable memory card 300.

In addition to the risk of being stolen, memory card 300 may possibly be accidentally inserted in any system differently configured. In such an event, the data in memory card 300 becomes inaccessible from any device unless such accesses are authorized as a result of the access authentication process (serial verification) described earlier. This may prevent undue data accesses even if memory card 300 is inserted in wrong systems.

(f2. Example of Access Authentication Process Using Model Verification)

FIG. 13 is a sequence diagram that illustrates an exemplified access authentication process using the model verification executed in control system 1 according to the embodiments. In FIG. 13 is illustrated the access authentication process (model verification) in the example of FIGS. 8 and 9. This drawing illustrates an example of restoration after a line configured similarly to that of control system 1 is duplicated.

Though not illustrated in the drawing, when memory card 300 is inserted in PLC 100*b* of slot 1 and a predetermined switch is turned on, the user is requested to input his/her user data on the screen of support device 400. When a user inputs, as user data, his/her user information (for example, account name) and password, support device 400 transmits the user data to memory card 300, as illustrated in FIG. 13 (step (1)).

Memory card 300 verifies user data 1360 retained by itself against the user data obtained from support device 400. When these two pieces of user data obtained from the different sources are consistent with each other, memory card 300 transmits certificate data 1370 retained by itself to PLC 100*b* of slot 1 (step 2)). Memory card 300 does not transmit certificate data 1370 unless the user data is authenticated.

When PLC 100*b* of slot 1 determines that memory card 300 is a genuine product supplied by the original manufacturer based on certificate data 1370, PLC 100*b* transmits, to memory card 300, authentication data indicating that memory card 300 has been authenticated (step 3)). PLC 100 of slot 1 does not transmit the authentication data unless memory card 300 is determined as being a genuine product supplied by the original manufacturer.

PLC 100*b* of slot 1 verifies user data 1160 retained by itself against the user data obtained from support device 400. When these two pieces of user data obtained from the different sources are consistent with each other, PLC 100*b* transmits certificate data 1170 retained by itself to memory card 300 of slot 1 (step 4)). PLC 100*b* of slot 1 does not transmit certificate data 1170 unless the user data is authenticated.

When memory card 300 determines that PLC 100*b* of slot 1 is a genuine product supplied by the original manufacturer based on certificate data 1170, memory card 300 transmits, to PLC 100*b*, authentication data indicating that PLC 100*b* has been authenticated (step 5)). Memory card 300 does not transmit the authentication data unless PLC 100*b* of slot 1 is determined as being a genuine product supplied by the original manufacturer.

When the processes in steps 1) to 5) are all completed, memory card 300 has been authenticated by PLC 100*b* in slot 1, and PLC 100*b* in slot 1 has been authenticated by memory card 300.

For the model verification, PLC 100*b* in slot 1 thereafter transmits identification data 1180 (model code "A") retained by itself to units 200*b* in slots 2 to 5 (step 6)). For the model verification, PLC 100*b* in slot 1 thereafter transmits identification data 1180 (model code "A") retained by itself to memory card 300 (step 7)).

For the model verification, units 200*b* in slots 2 to 5 thereafter transmit identification data 2180 (model codes "B", "B", "C" and "C") retained by themselves to memory card 300 (step 8)). For the model verification, memory card 300 thereafter transmits identification data 1380 (model code "X") retained by itself to units 200*b* in slots 2 to 5 (step 9)). For the model verification, units 200*b* in slots 2 to 5 thereafter transmit identification data 2180 retained by themselves to the other units 200*b* (step 10)).

As a result of the processes in steps 6) to 10), memory card 300, PLC 100*b* in slot 1 and units 200*b* in slots 2 to 5 obtain the pieces of identification data of the members (model codes).

After that, memory card 300, PLC 100*b* in slot 1 and units 200*b* in slots 2 to 5 verify the pieces of identification data (model codes) obtained from the members against the model codes of the members stored in the lists retained by themselves (step 11)).

As described referring to the examples of FIGS. 8 and 9, when the degree of consistency in the model code-based verification result is determined as high by one of the members (for example, member that first acquired the verification results of the members), memory card 300 enables PLC 100*b* to access the backup data and transmits the backup data to PLC 100*b* in slot 1 (step 12)).

After that, PLC 100*b* of slot 1 restores the data based on the backup data obtained from memory card 300 (step 13)).

In the example illustrated in FIG. 13, the backup data is transmitted from memory card 300 to PLC 100*b* of slot 1 when the degree of consistency in the model verification result is determined as high. Instead, the backup data may be transmitted from memory card 300 to PLC 100*b* of slot 1 after PLC 100*b* and memory card 300 are mutually authenticated. In this instance, PLC 100*b* of slot 1 may be prohibited from restoring the data unless the degree of consistency in the model verification result is determined as high.

When memory card 300 is received by PLC 100*b*, accesses to the backup data stored in memory card 300 are enabled only when the degree of consistency is determined as high among the members in the model code verification results obtained by any members but PLC 100*b*. This may ensure a higher level of security without compromising user-friendliness in accesses to the data stored in removable memory card 300.

Further advantageously, accesses to the backup data stored in memory card 300 are enabled in regard to the members of the same model code having different serial numbers. This may ensure a good balance between user-friendliness and better security in data accesses to removable storage media.

In addition to the risk of being stolen, memory card 300 may possibly be accidentally inserted in any system differently configured. In such an event, the data in memory card 300 becomes inaccessible from any device unless such accesses are authorized as a result of the access authentication process (model verification) described earlier. This may prevent undue data accesses even if memory card 300 is inserted in wrong systems.

<G. Supplementary Note>

As described thus far, the embodiments include the following technical aspects disclosed herein.

[Aspect 1]

A control system (1) is configured to control access to data in a device group, the device group includes a plurality of devices (100, 200-1 to 200-4), and the plurality of devices are configured to communicate with one another.

The control system is equipped with:
 a first device (100) included in the plurality of devices and configured to receive, in a removable manner, a storage medium (300) in which data is storable; and
 one or a plurality of second devices (200-1 to 200-4) included in the plurality of devices.

The control system (1) is further characterized in that,
 each of members of the plurality of devices and the storage medium include:
  a storage region (1332, 1132, 2162) configured to retain a list (300L, 100L, 200-1L to 200-4L) containing relevant information associated with each of the members; and
  a verifying unit (step 15) of FIG. 12, step 11) of FIG. 13) configured to verify the relevant information of each of other members included in the list retained in the storage region against the relevant information of each of the other members obtained from each of the other members, and
 the first device is configured to access the data stored in the storage medium when a result of verification obtained by the verifying unit of each of the other members but the first device satisfies a predetermined condition.

[Aspect 2]

In the control system (1) according to aspect 1, the first device includes a reader (1130) including a concealed logic for exclusive use, and
 the storage medium is configured to permit access from the reader alone.

[Aspect 3]

In the control system (1) according to aspect 1 or 2, the relevant information includes a serial number for identification of each of the members, and
 the verifying unit verifies the serial number of each of the other members included in the list retained in the storage region against the serial number of each of the other members obtained from each of the other members.

[Aspect 4]

In the control system (1) according to aspect 1 or 2, the relevant information includes a model code of each of the members, and
 the verifying unit verifies model code of each of the other members included in the list retained in the storage region against the model code of each of the other members obtained from each of the other members.

[Aspect 5]

The control system (1) according to aspect 1 or 2 further includes a support device (400) configured to support the device group and is further characterized in that, the relevant information includes a serial number used to individually identify each of the members and a model code of each of the members, the verifying unit includes:

a first verifying unit(step 15) of FIG. 12) configured to verify the serial number of each of the other members included in the list retained in the storage region against the serial number of each of the other members obtained from each of the other members; and a second verifying unit(step 11) of FIG. 13) configured to verify the model code of each of the other members included in the list retained in the storage region against the model code of each of the other members obtained from each of the other members, and the support device provides a user interface (454) configured to select the first verifying unit or the second verifying unit.

[Aspect 6]

The control system (1) according to one of aspects 1 to 5 further includes a support device (400) configured to support the device group and is further characterized in that, the support device provides a user interface (455) configured to set a number of any members included in the members but the first device to be verified by the verifying unit.

[Aspect 7]

The control system (1) according to one of aspects 1 to 6 further includes a support device (400) configured to support the device group and is further characterized in that, the support device provides a user interface (456) configured to set a range of applicable members among the members.

[Aspect 8]

A method (FIGS. 12 and 13) is provided for controlling access to data in a device group, the device group includes a plurality of devices (100, 200-1 to 200-4), and the plurality of devices are configured to communicate with one another.

The plurality of devices include:

a first device (100) configured to receive, in a removable manner, a storage medium (300) in which data is storable; and one or a plurality of second devices (200-1 to 200-4).

Each of members of the plurality of devices and the storage medium includes a storage region (1332, 1132, 2162) configured to retain a list (300L, 100L, 200-1L to 200-4L) containing relevant information associated with each of the members.

The method includes:

prompting each of the members to verify the relevant information of each of other members included in the list retained in the storage region against the relevant information off each of the other members obtained from each of the other members (step 15) of FIG. 12, step 11) of FIG. 13), and enabling the first device to access the data stored in the storage medium when a result of verification obtained by each of the other members but the first device satisfies a predetermined condition (step 16) of FIG. 12, step 12) of FIG. 13).

[Aspect 9]

A control device (100) is included in a device group, the device group has a plurality of devices (100, 200-1 to 200-4), and the plurality of devices are configured to communicate with one another.

The control device is configured to control access to data and includes a receiving portion (103) configured to receive, in a removable manner, a storage medium (300) in which data is storable.

The control device (100) is further characterized in that, each of members of the plurality of devices and the storage medium includes:

a storage region (1332, 1132, 2162) configured to retain a list (300L, 100L, 200-1L to 200-4L) containing relevant information associated with each of the members; and a verifying unit(step 15) of FIG. 12, step 11) of FIG. 13) configured to verify the relevant information of each of other members included in the list retained in the storage region against the relevant information of each of the other members obtained from the other members, and the control device is configured to access the data stored in the storage medium when a result of verification obtained by the verifying unit of each of the other members but the control device satisfies a predetermined condition.

<H. Advantages>

In control system 1 according to the embodiments disclosed herein, when memory card 300 is received by PLC 100, it is not until results of the relevant information verified by units 200 other than PLC 100 satisfy a predetermined condition that the data stored in memory card 300 becomes accessible. This may ensure a higher level of security without compromising user-friendliness in accesses to the data stored in removable memory card 300.

The embodiments disclosed herein are given by way of example in all aspects and should not be construed as limiting the scope of this disclosure. The scope of this disclosure is solely defined by the appended claims and is intended to cover the claims, equivalents, and all of possible modifications made without departing the scope of this disclosure.

REFERENCE SIGNS LIST

1: control system, 200: unit, 2: network, 4: local bus, 1001, 2001, 3001: list, 102, 402, 1131, 2161: processor, 103, 113: memory card interface, 104, 404: main memory, 105: USB connector, 106, 406, 1132, 2162: storage, 108, 416: network controller, 130, 418: processor bus, 140: control program, 210: function module, 220: local bus controller, 300: memory card, 400: support device, 408: input unit, 410: display unit, 412: optical drive, 414: recording medium, 450: screen, 451: field of user information, 452: field of user authentication method, 453: field of password, 454: field of verification method, 455: field of security level, 456: field of applicable range, 1060: system program, 1065, 2150: restoration program, 1130, 2130: security unit, 1133, 2163: memory, 1134, 1135: IO module, 1136: memory card controller, 1150: read program, 1160, 1360, 2160: user data, 1170, 1370, 2170, 3170: certificate data, 1180, 1380, 2180: identification data, 1331: data area, 1332: secure area, 1335: data, 1336: security controller, 4062: support program

The invention claimed is:

1. A control system configured to control access to data in a device group, the device group comprising a plurality of devices, the plurality of devices being configured to communicate with one another, the control system comprising:

a programmable logic controller (PLC) included in the plurality of devices and configured to receive, in a removable manner, a memory card in which backup data of the PLC is stored; and one or more second devices included in the plurality of devices and connected to the PLC, wherein each of members of the plurality of devices and the memory card comprises:
  a storage region configured to retain a list including relevant information associated with each of the members; and
  a storage storing one or more programs; and
  a processor that accesses the storage and executes the one or more programs to cause the processor to, when the memory card is received in the PLC, verify the relevant information of each of other members included in the list against relevant information of each of the other members obtained from each of the other members, wherein the processor of the PLC accesses the storage of the PLC and executes the one or more programs in the storage of the PLC to cause the processor to access the backup data stored in the memory card and restore the backup data when a verification result of each of the other members but the PLC satisfies a predetermined condition, and wherein the predetermined condition comprises that a degree of consistency between the verification results of the other members is greater than a threshold value.

2. The control system according to claim 1, wherein:
the PLC comprises a reader including a concealed logic for exclusive use, and
the memory card is configured to permit access from the reader alone.

3. The control system according to claim 1, wherein:
the relevant information includes a serial number for identification of each of the members, and
the processor verifies the serial number of each of the other members included in the list against a serial number of each of the other members obtained from each of the other members.

4. The control system according to claim 1, wherein:
the relevant information includes a model code of each of the members, and
the processor verifies the model code of each of the other members included in the list against a model code of each of the other members obtained from each of the other members.

5. The control system according to claim 1, further comprising a support device configured to support the device group, the support device comprising a storage that stores one or more programs and a processor,
wherein:
  the relevant information includes a serial number used to individually identify each of the members and a model code of each of the members,
  for each of the members, the processor of the member accesses the storage of the member and executes the one or more programs to cause the processor of the member to verify, in a first verification, the serial number of each of the other members included in the list against a serial number of each of the other members obtained from each of the other members; and
  for each of the members, the processor of the member accesses the storage of the member and executes the one or more programs to cause the processor of the member to verify, in a second verification, the model code of each of the other members included in the list against a model code of each of the other members obtained from each of the other members, and
  the processor of the support device accesses the storage of the support device and executes the one or more programs to cause the processor of the support device to provide a user interface configured to select the first verification or the second verification.

6. The control system according to claim 1, further comprising a support device configured to support the device group, the support device comprising a storage that stores one or more programs and a processor,
wherein the processor of the support device accesses the storage of the support device and executes the one or more programs to cause the processor of the support device to provide a user interface configured to set a number of members included in the members except for the PLC to be verified.

7. The control system according to claim 1, further comprising a support device configured to support the device group, the support device comprising a storage that stores one or more programs and a processor,
wherein the processor of the support device accesses the storage of the support device and executes the one or more programs to cause the processor of the support device to provide a user interface configured to set a range of applicable members among the members.

8. The control system according to claim 1, wherein, for each of the members, the processor and storage of the member is combined in a dedicated hardware circuit.

9. The control system according to claim 1, wherein the PLC and the one or more second devices are connected to a local network.

10. A method for controlling access to data in a device group, the device group comprising a plurality of devices, the plurality of devices being configured to communicate with one another, the plurality of devices comprising:
  a programmable logic controller (PLC) configured to receive, in a removable manner, a memory card in which backup data of the PLC is stored; and
  one or a plurality of second devices,
  each of members of the plurality of devices and the memory card comprising a storage region configured to retain a list including relevant information associated with each of the members,
the method comprising:
  prompting each of the members to, when the PLC receives the memory card, verify the relevant information of each of other members included in the list retained in the storage region against the relevant information of each of the other members obtained from each of the other members, and
  enabling the PLC to access the backup data stored in the memory card and restore the backup data when a result of verification obtained by each of the other members but the PLC satisfies a predetermined condition,
  wherein the predetermined condition comprises that a degree of consistency between the verification results of the other members is greater than a threshold value.

11. The method according to claim 10, wherein the PLC and one or more second devices are connected to a local network.

12. A control device included in a device group, the device group comprising a plurality of devices, the plurality of devices being configured to communicate with one another, the control device being a programmable logic controller and being configured to control access to data, the control device comprising a memory card interface configured to receive, in a removable manner, a memory card in which backup data of the control device is stored, each of members of the plurality of devices and the memory card comprising:
- a storage region configured to retain a list including relevant information associated with each of the members;
- a storage storing one or more programs; and
- a processor that accesses the storage and executes the one or more programs to cause the processor to, when the memory card is received in the control device, verify the relevant information of each of other members included in the list retained in the storage region against relevant information of each of the other members obtained from each of the other members, wherein
the processor of the control device accesses the storage of the control device and executes the one or more programs to cause the processor of the control device to access the backup data stored in the memory card and restore the backup data when a verification result of each of the other members but the control device satisfies a predetermined condition, and wherein the predetermined condition comprises that a degree of consistency between the verification results of the other members is greater than a threshold value.

13. The control device according to claim 12, wherein, for each of the members, the processor and storage of the member is combined in a dedicated hardware circuit.

14. The control device according to claim 12, wherein the control device and one or more second devices are connected to a local network.

* * * * *